United States Patent [19]

Bahl et al.

[11] Patent Number: 4,817,156

[45] Date of Patent: Mar. 28, 1989

[54] RAPIDLY TRAINING A SPEECH RECOGNIZER TO A SUBSEQUENT SPEAKER GIVEN TRAINING DATA OF A REFERENCE SPEAKER

[75] Inventors: Lalit R. Bahl, Amawalk; Robert L. Mercer, Yorktown Heights; David Nahamoo, White Plains, all of N.Y.

[73] Assignee: International Business Machines Corporation, Armonk, N.Y.

[21] Appl. No.: 84,712

[22] Filed: Aug. 10, 1987

[51] Int. Cl.$^4$ ............................................. G01L 5/00
[52] U.S. Cl. .................................... 381/43; 364/513.5
[58] Field of Search .................................. 381/29–53; 364/513, 513.5

[56] References Cited

U.S. PATENT DOCUMENTS

| | | | |
|---|---|---|---|
| 4,587,670 | 5/1986 | Levinson et al. | 381/43 |
| 4,713,777 | 12/1987 | Klovstad et al. | 381/43 X |
| 4,713,778 | 12/1987 | Baker | 364/513.5 |
| 4,718,092 | 1/1988 | Klovstad | 381/43 |
| 4,718,093 | 1/1988 | Brown | 381/43 |
| 4,718,094 | 1/1988 | Bahl et al. | 381/43 |
| 4,741,036 | 4/1988 | Bahl et al. | 381/43 |
| 4,748,670 | 5/1988 | Bahl et al. | 381/43 |
| 4,759,068 | 7/1988 | Bahl et al. | 381/43 |

OTHER PUBLICATIONS

"An Introduction to Hidden Markov Models", Rabiner et al., IEEE ASSP Magazine, Jan. 1986, pp. 4–7.

Primary Examiner—Patrick R. Salce
Assistant Examiner—Emanuel Todd Voeltz
Attorney, Agent, or Firm—Marc A. Block

[57] ABSTRACT

Apparatus and method for training the statistics of a Markov Model speech recognizer to a subsequent speaker who utters part of a training text after the recognizer has been trained for the statistics of a reference speaker who utters a full training text. Where labels generated by an acoustic processor in response to uttered speech serve as outputs for Markov models, the present apparatus and method determine label output probabilities at transitions in the Markov models corresponding to the subsequent speaker where there is sparse training data. Specifically, label output probabilities for the subsequent speaker are re-parameterized based on confusion matrix entries having values indicative of the similarity between an lth label output of the subsequent speaker and a kth label output for the reference speaker. The label output probabilities based on re-parameterized data are combined with initialized label output probabilities to form "smoothed" label output probabilities which feature smoothed probability distributions. Based on label outputs generated when the subsequent speaker utters the shortened training text, "basic" label output probabilities computed by conventional methodology are linearly averaged against the smoothed label output probabilities to produce improved label output probabilities.

25 Claims, 14 Drawing Sheets

THE WORD 'THE'

DH            UH1

```
PHONE   MACHINE   3 (DH)

7 (STATES)

STATE 1
       -3   (ARCS)

ARC 1
                - DESTINATION STATE (4)
                - ARC TYPE (10)
             ARC 2
                .
                .
   STATE 2
       .
       .
   STATE 7
```

FIG.13

|      | K1    | K2    | K3    | K4    | ... | K200  |
|------|-------|-------|-------|-------|-----|-------|
| L1   | 0.002 |       |       |       |     |       |
| L2   | 0.010 |       |       |       |     |       |
| L3   | 0.001 |       |       |       |     |       |
| L4   | 0.004 |       |       |       |     |       |
| ...  |       |       |       |       |     |       |
| L200 | 0.001 |       |       |       |     |       |

$F_1(k)$ $F_2(l)$

FIG.14 ORIGINAL PARAMETER F-B PROCESSOR

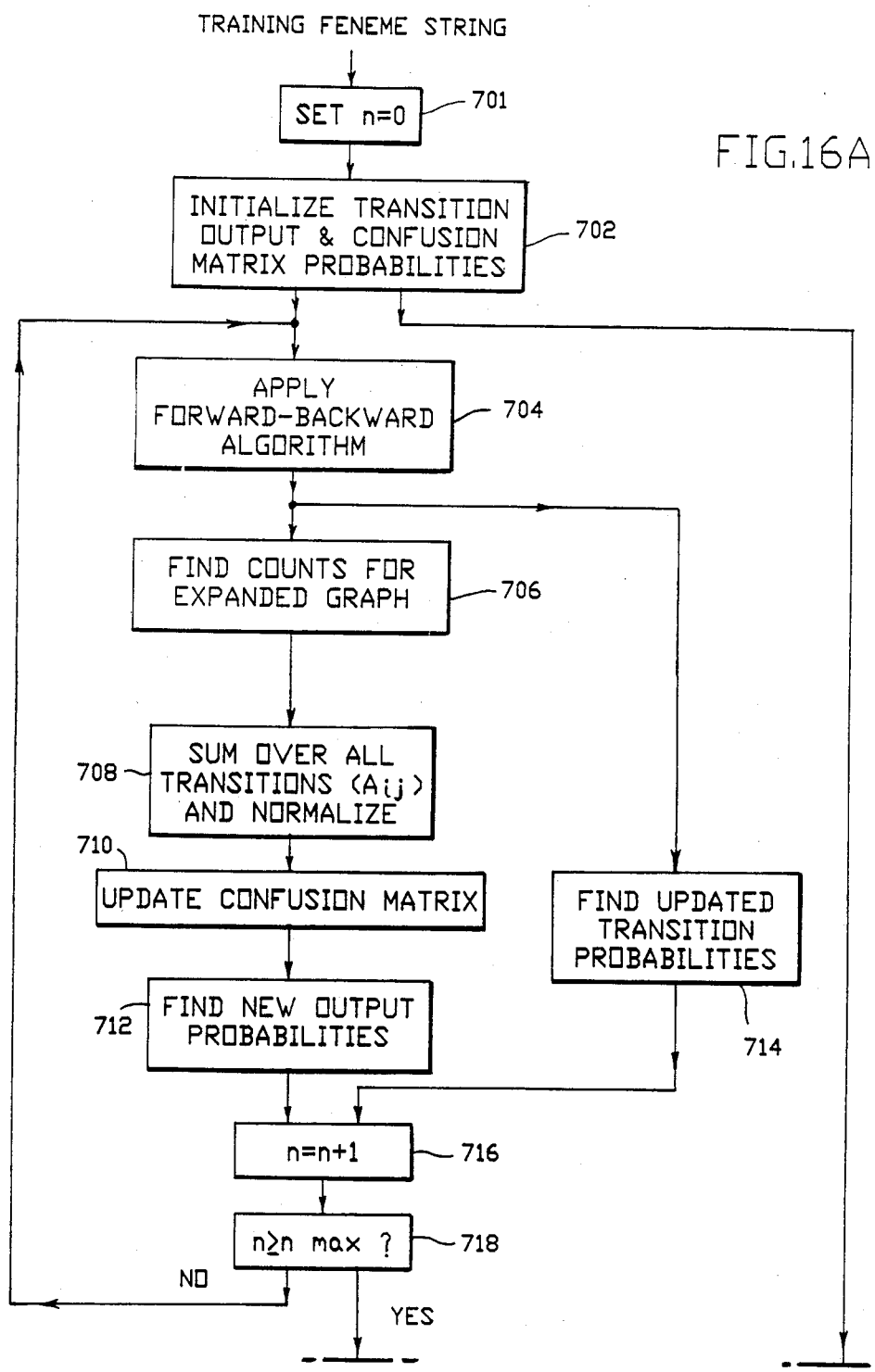

RAPIDLY TRAINING A SPEECH RECOGNIZER TO A SUBSEQUENT SPEAKER GIVEN TRAINING DATA OF A REFERENCE SPEAKER

BACKGROUND OF THE INVENTION

I. Field of the Invention

The present invention relates to apparatus and method for training the statistics of a Markov Model speech recognizer to a subsequent speaker after the recognizer has been trained for a reference speaker.

II. Description of the Problem

One approach to speech recognition involves the use of Hidden Markov Models (HMM). Hidden Markov Models have been discussed in various articles such as: "Continuous Speech Recognition by Statistical Methods" by F. Jelinek, *Proceedings of the IEEE*, volume 64, number 4, 1976 and "A Maximum Likelihood Approach to Continuous Speech Recognition", by L. R. Bahl, F. Jelinek, and R. L. Mercer *IEEE Transactions on Pattern Analysis and Machine Intelligence*, volume PAMI-5, Number 2, March 1983. These articles are incorporated herein by reference.

In performing speech recognition based on Hidden Markov Models, successive intervals of speech are examined by an acoustic processor with respect to various predefined characteristics of speech. For example, respective amplitudes for each of various energy frequency bands are determined for each time interval. Each respective amplitude represents a component, or feature. Together, the components combine to form a feature vector.

The acoustic processor defines a finite set of prototype, or reference, vectors. Each prototype vector has a unique label which identifies it. The feature vector at each successive time interval is compared with each prototype vector. Based on a prescribed distance measure, the closest prototype is selected. Hence, for each time interval a prototype vector (which most clearly represents the feature vector of the interval) is selected. As speech is uttered, the acoustic processor provides as output a string of labels.

In accordance with Markov models speech recognition, a set of Markov models is defined. Typically, such Markov models have corresponded one-to-one with phonetic elements. For eighty phonetic elements, then, there are eighty respective Markov models. The Markov models corresponding to successive phonetic elements of a word can be concatenated to form a Markov model baseform for the word.

Each Markov model is characterized as having a plurality of states and a plurality of transitions. Each transition extends from a state to a state. At least some transitions represent a time interval during which a prototype vector label is selected by the acoustic processor. For each transition, there is a transition probability and, in some cases, output probabilities. Typically associated, the transition probabilities indicate the likelihood of following a given transition in a Markov model. The output probabilities indicate the likelihood of a certain output label (e.g., prototype vector label) being produced during a given transition.

For a certain transition $A_{ij}$ extending from state i to state j, there is an associated transition probability $P(A_{ij})$ and, where there are 200 different prototype vectors, there are 200 associated output probabilities:

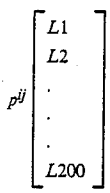

Normally, but no necessarily, the skeletal structure of states with connecting transitions (without probability values assigned) is the same for each Markov model.

For a given speaker, the various respective Markov models for the different phonetic elements differ typically in the values of the probabilities associated therewith. In order to be operative, the various transition probabilities and output probabilities for each Markov model must be determined.

The physical implementation of the Markov model is referred to as a "phone machine", or Markov model phone machine. The phone machine for a corresponding phonetic element includes memory locations for storing the transition probabilities, output probabilities, shape of the phone machine, identifiers indicating which phonetic element is represented thereby, and other such information which characterizes the respective Markov model.

The process of determining the transition probabilities and output probabilities so that they may be stored for phone machines is referred to as "training."

Typically, a distinct set of transition probabilities and output probabilities must be determined for each speaker. That is, for each speaker, the speech recognizer stores data (e.g., transition probability values and output probability values) for a respective set of phone machines.

The conventional approach to training is for a speaker to utter a known sample text into an acoustic processor. The sample text represents a known sequence of phonetic elements and, hence, a known corresponding sequence of phone machines. The acoustic processor generates a string of prototype labels in response to the uttered speech input. From the string of prototype labels generated for the known sample text and from initially set values of the transition probabilities and output probabilities (which may not reflect actual speech characteristics), improved probability values can be determined by applying a forward-backward algorithm, or Baum-Welch algorithm, to produce transition counts and output counts, deriving transition probabilities and output probabilities therefrom, applying the forward-backward algorithm with the derived probabilities to produce updated counts, and so on over a number of iterations. The probability values after the last iteration are referred to herein as "basic" transition probabilities and "basic" output probabilities.

In order to generate reasonably accurate "basic" probabilities, it is necessary for a speaker to utter a relatively long sample text, extending, for example 20 minutes.

In accordance with prior technology, each speaker would be required to utter the 20-minute sample text in order to train the speech recognizer to his/her speech.

A required training period of 20 minutes per speaker may be undesirably long and inconvenient.

Also however, the amount of computing the speech recognizer must perform for 20 minutes of training text in accordance with the forward-backward algorithm in order to determine "basic" probabilities is excessive.

Accordingly, a significant problem in speaker dependent Markov model speech recognition has involved the lengthy period during which each speaker must utter text and the computationally costly process of applying the forward-backward algorithm to the full text for each speaker.

In a co-pending patent application by S. De Gennaro et al entitled "Speech Recognition System", (Docket No. YO984-108), Ser. No. 06/845,155, filed Mar. 27, 1986, assigned to International Business Machines Corporation, some of the transitions are grouped together to have common output probabilities applied thereto. Although reducing the required amount of training data, the sample text has remained nonetheless lengthy when multiple speakers are to be recognized.

SUMMARY OF THE INVENTION

It is an object of the present invention to provide apparatus and method for rapidly training a Hidden Markov Model speech recognizer to subsequent speakers after the speech recognizer has been trained to a reference speaker.

That is, after transition probabilities and output probabilities for a reference speaker have been determined, training statistics for a subsequent speaker are determined. According to the present invention, the time each subsequent speaker must utter text during training is greatly reduced.

In addition, the level of computation required to determine the transition probabilities and label output probabilities for a subsequent speaker is also reduced.

The present invention achieves the above objects by using (a) data determined during the training of the speech recognizer to a reference speaker and (b) similarity relations between data generated for the reference speaker and data generated for the subsequent speaker during utterance of the shortened sample text. The computational cost in employing the reference speaker data and similarity relation data is considerably less than applying the forward-backward algorithm to prototype outputs generated in response to utterance of the full training text.

In accordance with the invention, it is presumed that, for a subsequent speaker, each transition $A_{ij}$ from state i to state j has a corresponding transition probability $P(A_{ij})$ that is to be computed. There is also allocated, for each transition at which a label is produced, a number of label output probabilities to be computed. Where there are 200 distinct labels, there are normally 200 different label output probabilities at each non-null transition. For each transition for a state i to a state j, there is then (1) a transition probability $P(A_{ij})$ therefor and (2) for each non-null transition, a probability $P(F_2(l)|A_{ij})$ of generating each lth label given the transition from state i to state j (of the given model), where $F_2(l)$ represents the lth label for a subsequent speaker. The present invention reduces the data required to find the numerous probabilities $P(F_2(l)|A_{ij})$ by re-structuring the transition from state i to state j as a plurality of parallel transitions wherein the probability of each of the parallel transitions is of the form:

$$P(F_1(k)|A_{ij})\, P(F_2(l)|F_1(k))$$

where k identifies one of the N labels for the reference speaker. Taken collectively over all k values, the label output probability for the lth label output at transition $A_{ij}$ is:

$$P(F_2(l)|A_{ij}) = \sum_{k=1}^{N} P(F_1(k)|A_{ij}) P(F_2(l)|F_1(k)).$$

In examining the above equation, it is observed that the $P(F_1(k)|A_{ij})$ component corresponds to previously determined data for the reference speaker and that the $P(F_2(l)|F_1(k))$ component corresponds to a "confusion matrix" which defines a relationship between the labels of the reference speaker and a subsequent speaker. The confusion matrix is an NxN matrix (e.g., a 200×200 matrix for an embodiment in which there are 200 different labels). Each entry represents the probability of a label l spoken by the subsequent speaker corresponding to a label k spoken by the reference speaker. In this expanded model with parallel transitions, the probability of each transition corresponds to $P(F_1(k)|A_{ij})$ and the output probabilities correspond to confusion matrix values $P(F_2(l)|F_1(k))$.

From confusion matrix entries and other information, updated re-parameterized label output probabilities are computed. The updated re-parameterized label output probabilities are linearly averaged with initialized label output probabilities in a deleted estimation processor to from smoothed relational probabilities. Basic parameter label output probabilities, determined in a conventional forward-backward algorithm manner, are then linearly averaged with the smoothed relational label output probabilities to form final label output probabilities for the subsequent speaker. The final label output probabilities for the subsequent speaker are generated with the subsequent speaker uttering only approximately ⅓ of the full training text; however, the accuracy achieved with a Markov model speech recognizer employing the final label output probabilities is comparable to the accuracy achieved when full text training is used. Moreover, the overall computational cost in computing the final label output probabilities is considerably less than that required for full training text training.

BRIEF DESCRIPTION OF THE DRAWINGS

FIG. 13 is an illustration of a store confusion matrix.

FIGS. 16A and 16B are flowchart diagrams of a training methodology according to the present invention.

DESCRIPTION OF THE INVENTION

A. Speech Recognition System Environment with Phonetic Phone Machines

Figure 1:
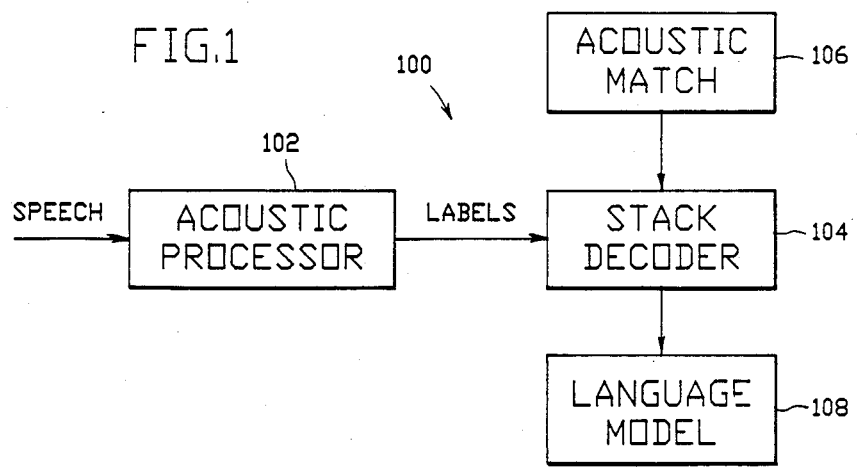
FIG. 1 is a general block diagram of a speech recognizer.

Referring to FIG. 1, a basic speech recognition system 100 is shown to include an acoustic processor 102, a stack decoder 104, an acoustic match processor 106, and a language model processor 108.

Briefly, the acoustic processor 102 defines an alphabet of speech types based on some prescribed characteristics. Each characteristic preferably relates to a value corresponding to an energy frequency band. In a copending patent application (Docket No. YO984-015), by J. Cohen et al, entitled "Nonlinear Signal Processing in a Speech Recognition", Ser. No. 665,401, filed Oct. 26, 1984, and assigned to International Business Machines Corporation, each characteristic corresponds to a "neutral firing rate" ascribed to a corresponding frequency band of energy.

Defining all speech as a spectral space, speech types represent regions in the space. Each speech type covers a distinct cluster of sounds in the space. Each component of the space corresponds to one of the prescribed characteristics. Hence, given values for each characteristic, a point or vector in the space is specified. Each point or vector, in turn, is contained in one of the clusters. A convenient method of determining the appropriate cluster for a given point or vector involves the use of prototypes. For each cluster, a representative prototype vector is defined. In determining which cluster (i.e., speech type) a point or vector belongs in, the distance between the subject point and each prototype vector is measured in a known manner. The subject point belongs to the speech type having the "closest" prototype vector.

For one interval of speech after another, respective values for the prescribed characteristics are combined to represent a "feature vector". For each time interval, a determination is made as to which speech type best represents the feature vector generated during the interval. Preferably, the acoustic processor 102 defines 200 different speech types, each having a respective prototype vector. Each speech type is identified by a corresponding numerical identifier, or label. Table 1 includes a preferable list of 200 speech types having labels AA11 through ZX3-. By conforming the labels to sounds represented thereby (AA11 to an "A" sound, ZX3- to a "Z" sound, and so on), human interpretation is facilitated. A more general scheme of labels identifies the 200 labels simply as L1 through L200.

In processing successive intervals of a speech waveform, the acoustic processor 102 generates a string of labels $y_1 y_2 y_3 \ldots y_T$. Each label in the string is selected from the alphabet of 200 labels, based on which corresponding speech type is determined the closest for a given interval t.

The prior art discloses a variety of techniques for clustering speech into speech types and representing each speech type by a prototype; and then selecting the closest prototype for each successive time interval.

The label string generated by acoustic processor 102 enters the stack decoder 104 and the acoustic match processor 106. The purpose of the stack decoder 104 is to determine which "path" of words is a likely path for the input string of labels, based on acoustic match and language model inputs. The language model processor 108 is based on word contexts. In particular, a collection of words has been previously examined to determine the frequency of three-word (i.e., tri-gram) and two-word (bi-gram) sequences, as well as single word (uni-gram) occurrences. Based on the tri-gram, bi-gram, and uni-gram data, the language model processor 108 provides input to the stack decoder 104 regarding the likelihood of a specific word following two preceding words.

Figure 2:
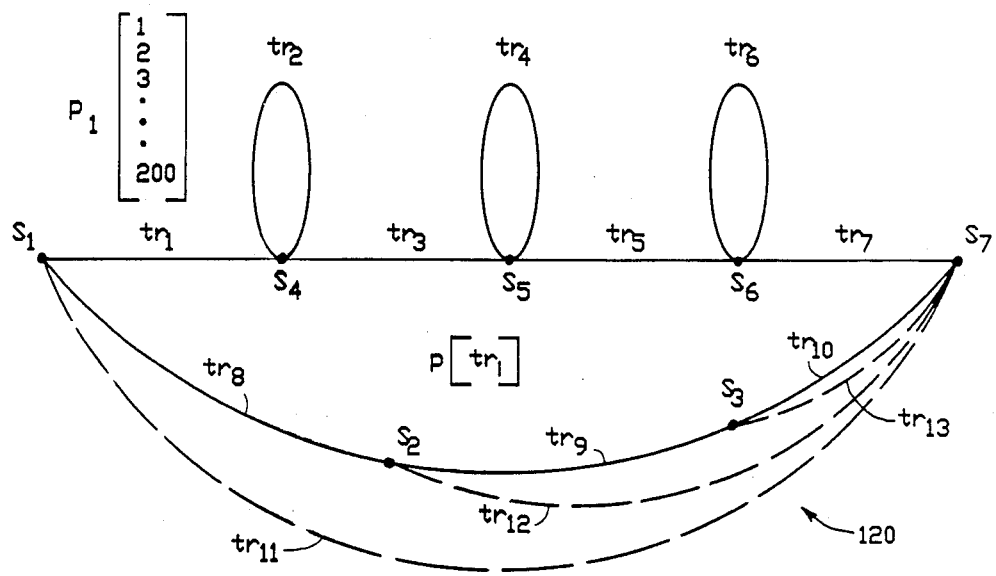
FIG. 2 is a graph illustrating an embodiment of a phonetic Markov model.

The other input to the stack decoder 104 is from the acoustic match processor 106. The acoustic match processor 106 produces an acoustic match score for each word in the vocabulary. The acoustic match score is determined based in Markov models implemented in the form of "phone" machines. The structure of a Markov model 120 is illustrated in FIG. 2. The Markov model 120 of FIG. 2 is a phonetic model in that it corresponds to a phonetic element. Phonetic elements (e.g., elements in the International Phonetic Alphabet) are well-known and in common use.

The phonetic Markov model 120 in FIG. 2 is represented as a plurality of states and transitions, each transition extending from a state to a state. Each transition may be viewed as corresponding to a time interval during which a label can be generated by the acoustic processor 102 (of FIG. 1). At successive time intervals, speech may be viewed as being produced while passing from a state to a state along a transition.

The phonetic Markov model 120 is illustrated with seven states S1 through S7 and thirteen transitions. From the initial state S1, there are three possible paths. The first extends along a transition $tr_1$ to state S4. The second extends along a transition $tr_8$ to state S2. And the third path from state S1 extends along transition $tr_{11}$ to a final state S7. From state S2, transition $tr_9$ or $tr_{12}$ may alternatively be followed to states S3 and S7 respectively. From state S3, transition $tr_{10}$ or $tr_{13}$ may alternatively be followed to state S7. Transitions $tr_{11}$, $tr_{12}$, and $tr_{13}$ are each represented by a dashed line and are referred to as "null transitions." A null transition corresponds to the departure from one state without outputting a label.

States S4, S5, and S6 each have a first transition which extends to a next state and a second transitions which "self-loops" back to the original state. With self-looping, one label output after another can be produced at successive time intervals without advancing to a "new" state.

Null transitions and self-loop transitions provide flexibility to the Markov model of FIG. 2 and account for variations which may occur in pronunciation at different times or under different conditions.

Figures 3, 4:
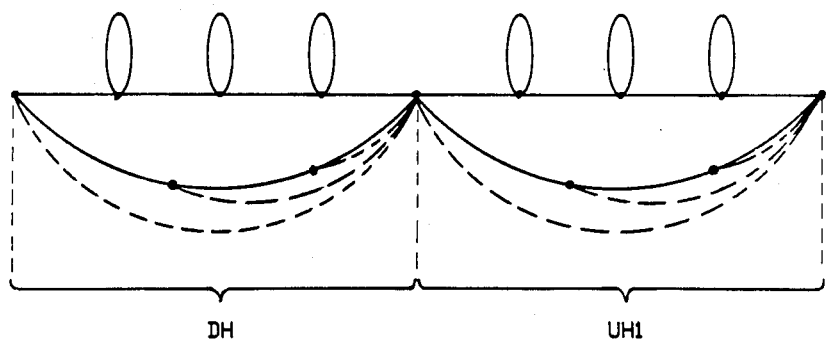
FIG. 3 is a diagram showing two Markov models linked together to form a baseform for the word "THE".
FIG. 4 is an embodiment of a "phone machine" which stores information relating to a respective Markov model from a predefined set of Markov models.

Preferably, in the phonetic environment, each phonetic elements is represented by respective phonetic Markov models. Words are represented as word baseforms by linking together Markov models of successive phonetic elements. In FIG. 3, one form of the word THE is spelled phonetically as DH-UH1. A phonetic Markov model for DH is shown followed by a phonetic Markov model for UH1. The work "THE" is thus represented as a sequence of two phonetic Markov models.

The respective phonetic Markov models are shown to have similar generate structures (i.e., seven states and thirteen transitions). However, referring again to the Markov model 120, it is observed that each transition $tr_1$ through $tr_{13}$ has a probability associated therewith and that, at each non-null transition, there is allocated an output probability for each label. For each transition, $tr_1$ through $tr_{10}$ there are two hundred probabilities; one probability indicating the likelihood of a label L1 (first label of the alphabet) being produced at a given transition, one probability of a label L2 (the second label of the alphabet being produced at the given transition), . . ., and one probability indicating the likelihood of a label L200 (the 200th label of the alphabet) being produced at the given transition. This is shown in FIG. 2 as $$P \begin{bmatrix} 1 \\ 2 \\ \cdot \\ \cdot \\ \cdot \\ 200 \end{bmatrix}$$

If there are 80 phonetic elements, there is a corresponding set of 80 different Markov models (for a given speaker). Each Markov model in the set has distinct transition probabilities and label output probabilities. The probabilities are determined during a training period (discussed in detail hereinbelow) and are stored in memory in the acoustic match processor 106 (of FIG. 1). The implementation of a Markov model, with probabilities and other related data stored therefor, is referred to as a "phone machine".

One simple method of storing the probabilities for a phone machine is shown in FIG. 4. Letting the phone machine for the phonetic element DH correspond to the 3rd phone machine of the set, the probability each of the 13 transitions of the DH phone machine are stored in a memory location identified as $p_3[tr_i]$ where $1 \leq i \leq 13$. The label output probabilities for each non-null transition are stored in locations identified as $$p_3{}^i[1]$$

through $$p_3{}^i[200].$$

Similar storage is provided for the phone machine corresponding to the phonetic element UH1. If UH1 corresponds to the 75th phone machine in the set, all UH1 probabilities are identified by a 75 subscript.

For 80 phonetic phone machines for Markov models like that of FIG. 2, the following probabilities are ordinarily determined and stored:
 200 [distinct labels generatable]
 ×10 [non-null transitions per phone machine]
 ×80 [distinct phone machines]
 1600,000 [label probabilities]
 13 [transitions per phone]
 ×80 [distinct phones]
 1040 [transition probabilities]

There are thus a total of 160,000+1040=161,040 probabilities that are known (or estimated).

To reduce the computational time required to generate all the probabilities and to reduce the required storage, several methods have been implemented. According to one method, it is assumed that the non-null transitions of each phone machine may be grouped into three sections. The first section includes transitions 1, 2, and 8; the second includes transitions 3, 4, 5, and 9; and the third includes transitions 6, 7, and 10. It is also assumed that, although each transition maintains its respective probability, the label output probabilities at the various transitions in a section are the same. That is, for transitions 1, 2, and 8, there is a single common label output probability distribution. Similarly, the transitions in the second section have a common label output probability distribution and the same for the transitions in the third section.

Table 2 shows storage for the DH phone according to this method. In Table 2, "node" corresponds to the state number; "arc" corresponds to a transition between two nodes (i.e., from a state to a state); "count" is a value determined during training; and "prob" is a probability value for a corresponding transition. Three counts are provided for each label output AA11 to ZX3-. Table 2 lists label outputs AE13 through XX23 which have count values about a given threshold (e.g. 0.01). Although the table is condensed for purposes of facilitated viewing, it should be recognized that the table actually stored in the system has three count entries for each of the 200 labels. The first column of counts corresponds to counts generated in transition corresponding to the first section of the phone machine; the second column corresponds to counts for the second section; and the third column corresponds to counts for the third section. It is noted that each non-null transition is assigned to a corresponding column number 4, 5, or 6 —for example, transition 1→2 is assigned to column 4 and transition 6→6 is assigned to column 6.

Figure 5:
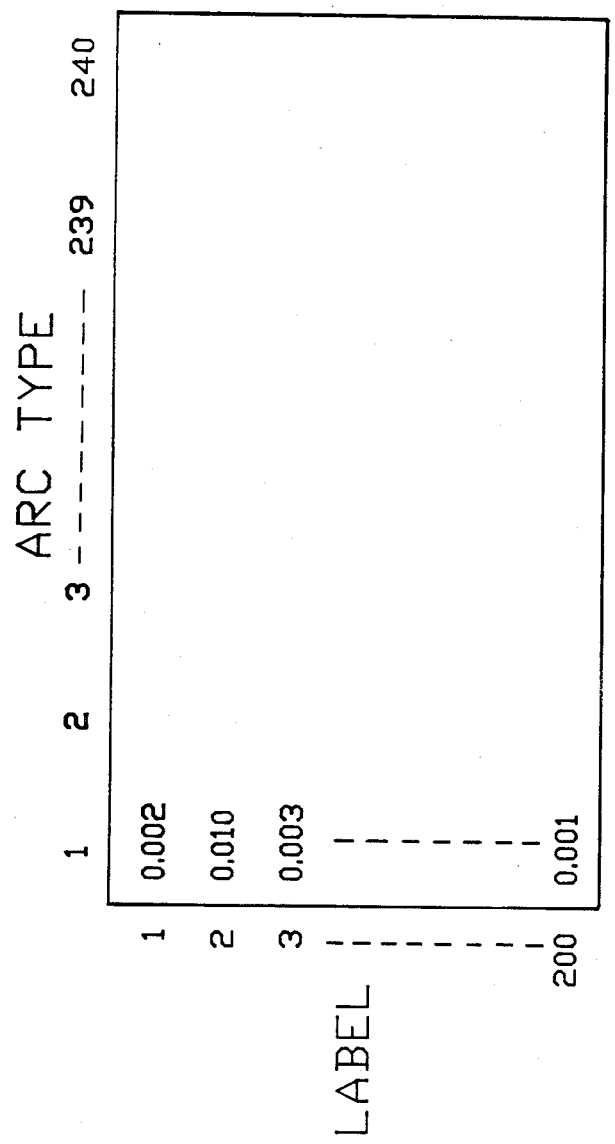
FIG. 5 is an illustration of a stored matrix which contains probabilities of labels for 240 different arc types.

Another memory structure for a phone machine is illustrated by FIG. 4 and FIG. 5. In FIG. 4, one phone machine is identified by its numerical label 3 (e.g., for the DH phonetic element phone machine). In memory, the number of states of the phone machine is stored. For each state, the number of arcs (or transitions) is also stored. Also, for each arc, the destination state is indicated and an arc type is specified. As in Table 2, it is assumed that each phone machine has three label output probability distributions associated therewith; that is a label output distribution for the first section, a label output distribution for the second section and a label output distribution for the third section of the phone machine. For 80 phone machines, there are 240 label output probability distributions. In FIG. 5, there are 240 label output distributions stored in a matrix form. Each column of the matrix represents a label output probability distribution (across the 200 labels) and each corresponds to a distinct arc type. In FIG. 4, the arc type entry points to one of the columns in the FIG. 5 matrix.

With probabilities stored for each phone machine and with prescribed sequences of phone machines representing words in a vocabulary, the acoustic match processor 106 is able to determine the likelihood of a word given a string of labels (or speech types). That is, given a string of labels, the acoustic processor 106 examines the phone machines for a first word and determines the likelihood of those phone machines generating successive labels in the string. Briefly, the acoustic match score for a word is computed by following the various paths the label string could follow through the phone machines which form the word and applying the probabilities appropriately.

By way of short example, suppose the acoustic processor 102 (of FIG. 1) generates labels L200-L199-L15-L14-... The computing of an acoustic match score by the acoustic match processing 106 (of FIG. 1) commences as follows for the word "THE". At the first time interval, label L200 is generated by the acoustic processor 102 (of (FIG. 1). Two initial branches are considered: along the first branch, label L200 may be produced along transition $tr_1$; and along the second branch label L200 may be produced along transition $tr_8$. The acoustic matcher 106 looks to the phone machine for phonetic element Dh to see what the stored probabilities are for (1) taking transition $tr_1$ and (2) producing label L200 at transition $tr_1$ (in the first section of the phone machine). If the $tr_1$ probability is 0.5 and the label output probability for L200 is 0.001, then the likelihood of following the first path and producing the L200 output is (0.5)(0.001)=0.0005.

After reaching state S4, there are two possible paths for producing label L199. One path involves following the self-loop transition $tr_2$ and producing label L199. The other path involves following transition $tr_3$ to state S5 and producing label L199. Suppose that the probability of following transition $tr_2$ in the DH phone machine is 0.3 and that the probability of following transition $tr_3$ is 0.7. Also suppose that the probability of producing the label L199 on transition $tr_2$ in the DH phone machine is 0.025 and that the probability of producing the label L199 on transition $tr_3$ in the DH phone machine is 0.004. The probability of producing label L199 along transition $tr_2$ is computed as (0.3)(0.025)=0.0075. The probability of producing label L199 along transition $tr_3$ is computed as (0.7)(0.004)=0.0028. The likelihood of producing labels L200-L199 along transitions $tr_1$ and then $tr_2$ is computed as (0.0005)(0.0075) and the likelihood of producing labels L200-L199 along transitions $tr_1$ and then $tr_3$ is computed as (0.0005)(0.0028). The joint probability of following producing label L200 at transition $tr_1$ and producing L199 at transition $tr_2$ or $tr_3$ is then $PROB_I=(0.0005)(0.0075)+(0.0005)(0.0028)=0.00000515$.

Along the second branch extending from state S1 along transition $tr_8$, the acoustic matcher 106 (of FIG. 1) retrieves the probability of following transition $tr_8$ and the probability of producing label L200 at transition $tr_8$. The product of $p(tr_8) \times p^8[200]$ yields the probability of following transition $tr_8$ and producing label L200 along that transition. If label L199 is to be produced by the DH phone machine from state S2, it must be along transition $tr_9$. The related probability of that event is $p(tr_9) \times p^9[199]$. Hence, the probability of generating L200-L199 by following transitions $tr_8$ and then $tr_9$ is $PROB_{II}=\{p(tr_8) \times p^8[200]\}\{p(tr_9 \times p^9[199]\}$.

The probability of the DH phone machine producing the labels L200-L199 is then $PROB=PROB_I+PROB_{II}$.

For the labels which follow L200 and L199, computations are further performed, and expanded along the various possible branches.

At this point, it is observed that the DH phone machine of FIG. 3 may be transversed with any number of label outputs being produced. Along null transition $tr_{11}$, the Dh phone machine may be, in effect, passed over without producing any label output. In this event, the probability of following the null transition $tr_{11}$ enters the computation and the probability of generating the label string continues with the UH1 phone machine.

There are various known techniques for partitioning the label string either based on words or based on phone machines. In the former case, words may be uttered with distinct pauses therebetween, thereby enabling the system to detect which substring of labels corresponds to a word based on intervals of detected silence. For phonetic phone machines and labels which are generated by an acoustic processor 102 at centisecond intervals, there are typically eighty to one hundred labels per word. With such isolated word speech, the labels corresponding to one word after another are identified.

In the aforementioned co-pending patent application, by S. DeGennaro et al, (Docket No. YO984-104), Ser. No. 06/845,155, probability distributions for phonetic phone machine endtimes are determined. Accordingly, labels for one phone machine after another, based on probabilities, are determined.

One vocabulary word after another is selected in order to compute an acoustic match score for each word. For each word, the sequence of phone machines —including the probabilities stored therefor—is retrieved. The possible paths which the identified labels can follow through the sequence of phone machines is determined and, as illustrated hereinabove, probabilities are computed.

This approach is called a detailed acoustic match and is described in the aforementioned co-pending patent application Ser. No. 06/845,155.

B. Speech Recognition with Fenemic Phone Machines

As an alternative to phonetic phone machines, "fenemic" phone machines may be employed in constructing the word baseforms.

A "feneme" is simply a label. A "fenemic" phone machine is a phone machine which corresponds to a feneme, or label, rather than to a phonetic element. Where there are 200 labels in the alphabet of labels, there are 200 fenemic phone machines —one for each feneme.

Figure 6:
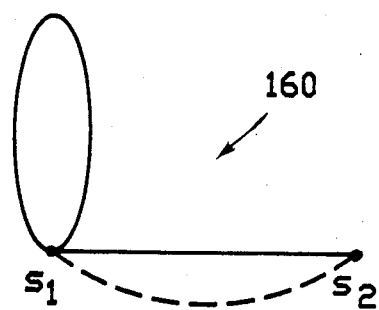
FIG. 6 is a graph illustrating an embodiment of a "fenemic" Markov model.

Each fenemic phone machine has a structure 160 such as that shown in FIG. 6. The fenemic phone machine has two states S1 and S2. Between states S1 and S2 are a null transition and a non-null transition. At state S1 is a self-loop non-null transition. Each transition has a respective probability determined during training. Each non-null transition has a probability for each label output. For example, the self-loop transition for the fenemic phone machine AA11 has a transition probability $p(tr_s)$ and a probability of producing each label at the self-loop transition:

$$P \begin{bmatrix} 1 \\ 2 \\ \cdot \\ \cdot \\ \cdot \\ 200 \end{bmatrix}$$

The probability of producing the speech type AA11 (e.g. label L1) for the AA11 fenemic phone machine should be high. However, due to differing speech pronunciations from one time to another, other labels normally also have a probability of being produced during a transition of the AA11 phone machine.

As with phonetic phones, word baseforms can be constructed as respective sequences of fenemic phone machines. There are normally on the order of eighty to one hundred fenemic phone machines per word where labels are generated every centisecond.

Figure 7:
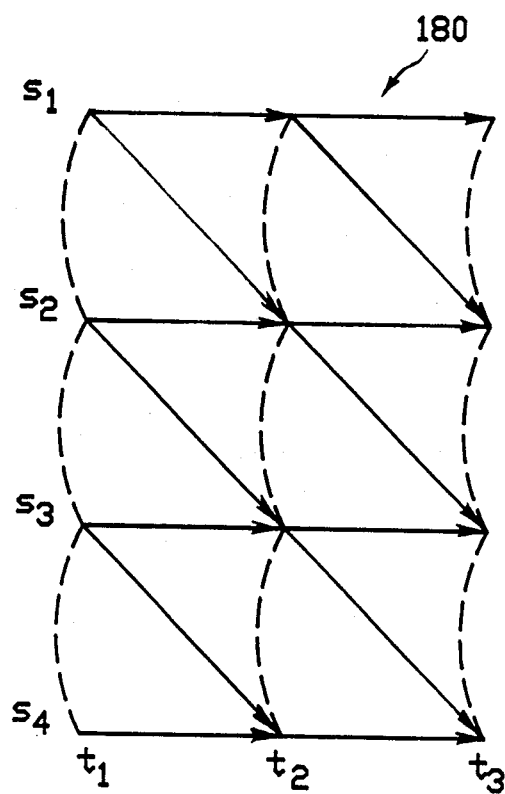
FIG. 7 is an illustration showing a trellis representation of concatenated fenemic Markov models.

A convenient manner of depicting all the paths through successive fenemic or phonetic, phone machines is in trellis form. A fenemic phone machine trellis 180 is shown in FIG. 7. For a given string of labels generated by an acoustic processor 102 (of FIG. 1), a variety of paths through the trellis may be followed. Starting at the upper left—state S1 at time t1—the first fenemic phone may be skipped by following the null (dashed) transition vertically down to state S2. State S2 represents the initial state of the second fenemic phone machine. Also from state S1 at time t1, a label output may be produced following the self-loop, which is depicted as a horizontal move from state S1 back to state S1 at time t2. Lastly, a label output may be produced with a move from state S1 to state S2 at time t2. For fenemic phones, each point on the trellis provides similar alternative paths.

Still referring to FIG. 7, it is noted that the trellis provides numerous possible routes for a string of labels. For example, for two labels produced between states S1 at time t1 and S3 at time t3, thirteen routes are possible. For example, a first route includes two self-loops at state S1 followed by two null transitions at time t3; a second route includes a self-loop transition at state S1, a transition to state S3 at time t3, and a null transition at time t3; a third route includes a self-loop at state S1, a null transition to state S2, a self-loop at state S2, and a null transition to state S3; a fourth route includes a self-loop at state S1, a null transition to state S2, a transition to state S3 at time t3; a fifth route includes a null transition at time t1, a self-loop at state S2, and a transition to state S3 at time t3; a sixth route includes a null transition at time t1, a transition from state S2 to S3 at time t2, and a null transition at state S3 and so on.

The computations are preferably performed by iteratively computing the probabilities of each node (i.e. state-time point) in the trellis. This is described in detail in the above-mentioned F. Jelinek article "Continuous Speech Recognition Statistical Methods."

Apparatus and methodology for constructing fenemic word baseforms formed of fenemic phones are set forth in a copending commonly owned patent application which is incorporated herein by reference to the extent (if any) required for adequate disclosure. The application is entitled "Feneme-based Markov Models for Words", (Docket No. YO983-136), Ser. No. 06/697,174 filed Feb. 1, 1985. As with the present invention and other patent applications cited herein, this application pertains to an invention made by members of the IBM Corporation Speech Recognition group.

Whether phonetic phone machines or fenemic phone machines are used, acoustic match scores for word baseforms are computed for at least some words in the vocabulary. Words having the higher scores are more likely candidates for the spoken word to be recognized.

C. Training the Phone Machines

Having described the operation of a Hidden Markov Model speech recognizer which is based on phone machines (such as phonetic phone machines and fenemic phone machines) which have been trained, the present invention which relates to training is now disclosed. In particular, apparatus and method for determining the label output probabilities corresponding to a subsequent speaker following the training for a reference speaker is now disclosed.

Figure 8:
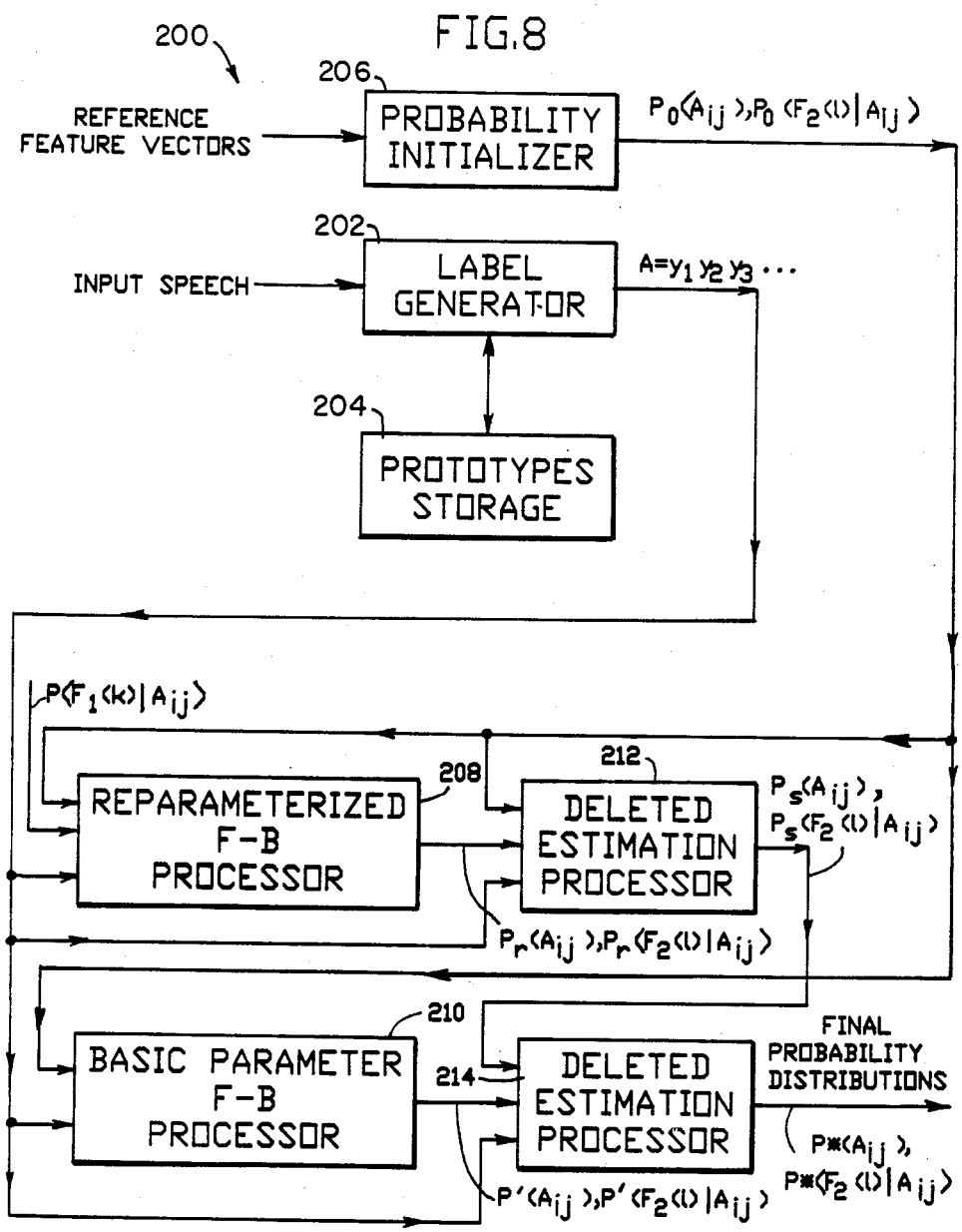
FIG. 8 is a general block diagram of a training apparatus according to the present invention.

FIG. 8 is a general block diagram of apparatus 200 for training (Markov model) phone machines according to the invention. Input speech of a training text is shown entering a label generator 202. Label generator 202 looks at one time interval of speech after another and determines the values for each of various prescribed characteristics, or features, relating to the speech. Each characteristic corresponds to one component of a feature vector. At each interval, a feature vector is generated.

For each speaker, there are specified a distinct alphabet of prototype vectors. The alphabet of prototype vectors for each speaker is stored in prototype storage 204. For each successive feature vector at successive time intervals, the closest prototype vector thereto is determined. The label for the closest prototype vector is then assigned to the given interval. For successive intervals, a string of labels is generated.

Referring to FIG. 2, it is observed that the label generator 202 and prototypes storage 204 correspond to the acoustic processor 102.

Figure 9:
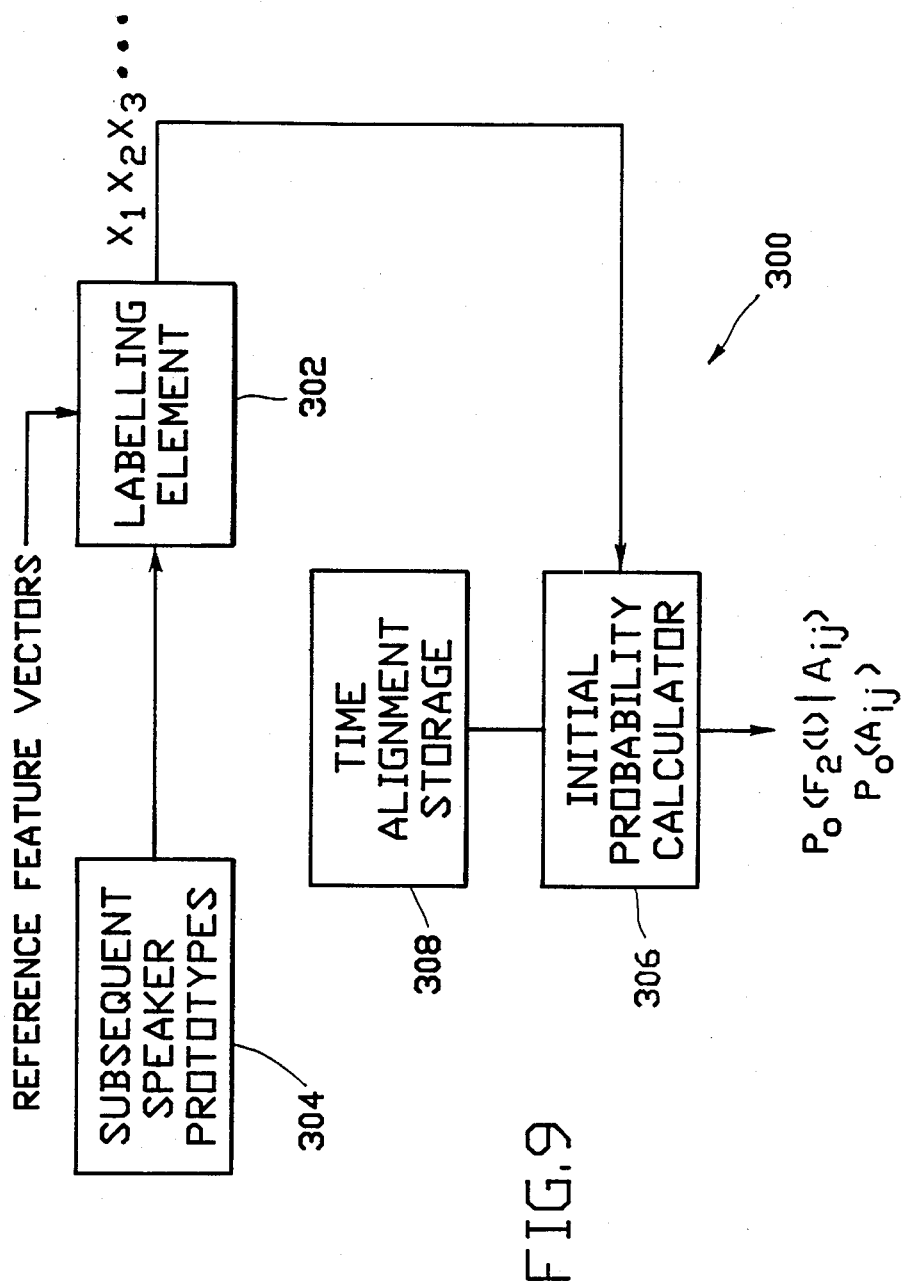
FIG. 9 is a block diagram of a probability initializer of FIG. 8.

Referring back to FIG. 8, a probability initializer 206 is shown. The purpose of the probability initializer 206 is to provide starting point probability values from which accurate informative probability values may be determined. The initialized values normally do not closely reflect real speech and are inadequate for use in speech recognition. A preferred initializer 300 is depicted in FIG. 9.

In accordance with the invention, it is assumed that a reference speaker has previously uttered a full training text, that a series of input vectors were generated in response to uttered speech of the reference speaker, and that transition probabilties $P(A_{ij})$ and label output probabilities $P(F_1(k)|A_{ij})$ have been previously determined. The input vectors for the reference speaker enter a labeller element 202. The labeller element 302 assigns a label to each input vector. Significantly, the labeller element 302 assigns labels based on the prototype vectors defined for a subsequent speaker. The prototype vectors for the subsequent speaker are determined from data only generated in response to the subsequent speaker uttering part of the training text. The defining of prototype vectors and clustering feature vectors into speech types is well-known in the art.

The string of labels exitting labeller element 302 is referred to as $A_2 = x_1 x_2 x_3 \ldots$ The label string $A_2$ enters an initial probability calculator 306. Also entering the initial probability calculator 306 is alignment information from time alignment storage 308. Storage 308 contains data correlating phone machine transitions with labels. In this regard, it is observed that during the training of the reference speaker, a text corresponding to a given sequence of phone machines is uttered. From Viterbi alignment, a correlation (time alignment) between each phone machine (for the reference speaker) and a label segment in a string $A_1$, (i.e. a label string based on reference speaker prototypes) is known. The string $A_2$ is aligned label-by-label the same as is string $A_1$. If b1 labels of string $A_1$ are aligned with a first phone machine, b1 labels of string $A_2$ are also aligned with the first phone machine; and so on. The correlation between labels of $A_2$ and phone machines are therefore provided in storage 308.

By way of example, reference is made to a phone machine PM1. Viterbi alignment during the training period for the reference speaker specifies that the first p labels of string $A_1$ correlate to phone machine PM1. The number of labels assigned to each successive phone machine transition are stored in the time alignment storage 308. The initial probability calculator 306 divides the string of labels $A_2$ in the same manner as is string $A_1$ so that the first p labels of string $A_2$ correlate to the transition PM1.

Based on the alignment between phone machines and label string $A_2$, initial counts for the subsequent speaker—which correspond to occurrences of a given label for a given phone machine—are computed. For example, in the training text, the phone machine PM1 may occur fifteen times. The labels which correlate to each occurrence of PM1 are known due to the alignment process. The number of times each label (i.e., speech type), is aligned so that it occurs during an occurrence of phone machine PM1 is counted. That is, for label L1 aligned with a phone machine PM1, there is a corresponding count; for label L2 aligned with phone machine PM1, there is a corresponding count; and so on. A similar procedure is followed for each phone machine, resulting in each phone machine having a respective count for each label. The initial probability calculator 306 normalizes the counts to produce probabilities of the form $(P_o(F_2(l)|PM_i)$ where l represents a label and $PM_i$ represents the ith phone machine. Assuming an even distribution of the labels over the various transitions of a phone machine, the initial probability calculator 306 provides as output label output probabilities of the form $P_o(F_2(l)|A_{ij})$ where $P_o$ indicates an initial probability.

The initial transition probabilities $P_o(A_{ij})$ are simply obtained by assigning fixed values which are speaker independent.

Referring again to FIG. 8, the initial probabilities are shown entering a re-parameterized forward-backward processor 208 and a basic parameter forward-backward processor 120.

The reparameterized forward-backward processor 208 receives as input (i) the initialized probabilities, (ii) a string of labels $y_1y_2y_3...$, generated—based on subsequent speaker prototypes—when the subsequent speaker utters part of the training text, and (iii) the label output probabilities for the reference speaker $P(F_1(k)|A_{ij})$ as previously determined during the reference speaker training period.

In brief, the re-parameterized forward-backward processor 208 re-specifies an original Markov model to an expanded graph form which includes similarity data between the reference speaker and the subsequent speaker. Stated otherwise, each non-null transition in an original Markov model has a transition probability and probabilities of producing respective labels at the transition; for the expanded graph, output probabilities of the Markov model are redefined. Each output probability for the Markov model $P(F_2(l)|A_{ij})$ is re-specified in terms of the sum of similarity measures $P(F_2(l)|F_1(k))$ over all k values normalized by $(P(F_1(k)|A_{ij})$ where k identifies a label in the alphabet of N labels. The re-parameterized forward-backward processor 208 produces re-parameterized label output probabilties based on expanded Markov models according to the expression:

$$P(F_2(l)|A_{ij}) = \sum_{k=1}^{N} P(F_1(k)|A_{ij})P(F_2(l)|F_1(k)).$$

Figure 10:
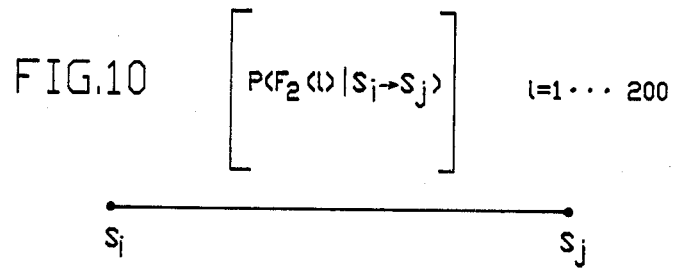
FIG. 10 is an illustration of an original Markov model graph between two states i and j.

FIG. 10 illustrates an original Markov graph for a label output probability.

Figure 11:
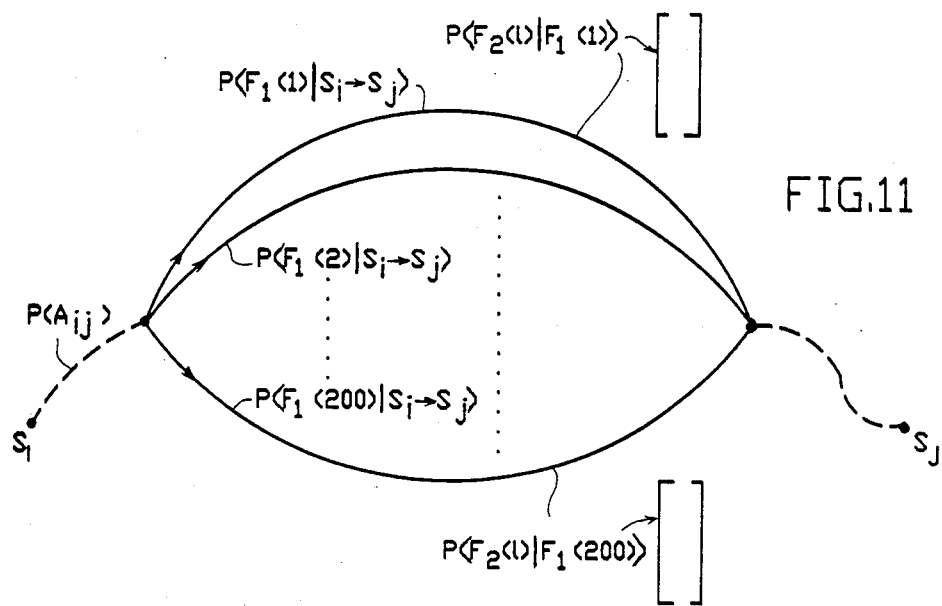
FIG. 11 is an illustration of an expanded Markov model graph between two states i and j, wherein parallel branches correspond to re-parameterized data.

FIG. 11 shows an expanded graph based on the expression set forth immediately hereinabove.

Figure 12A:
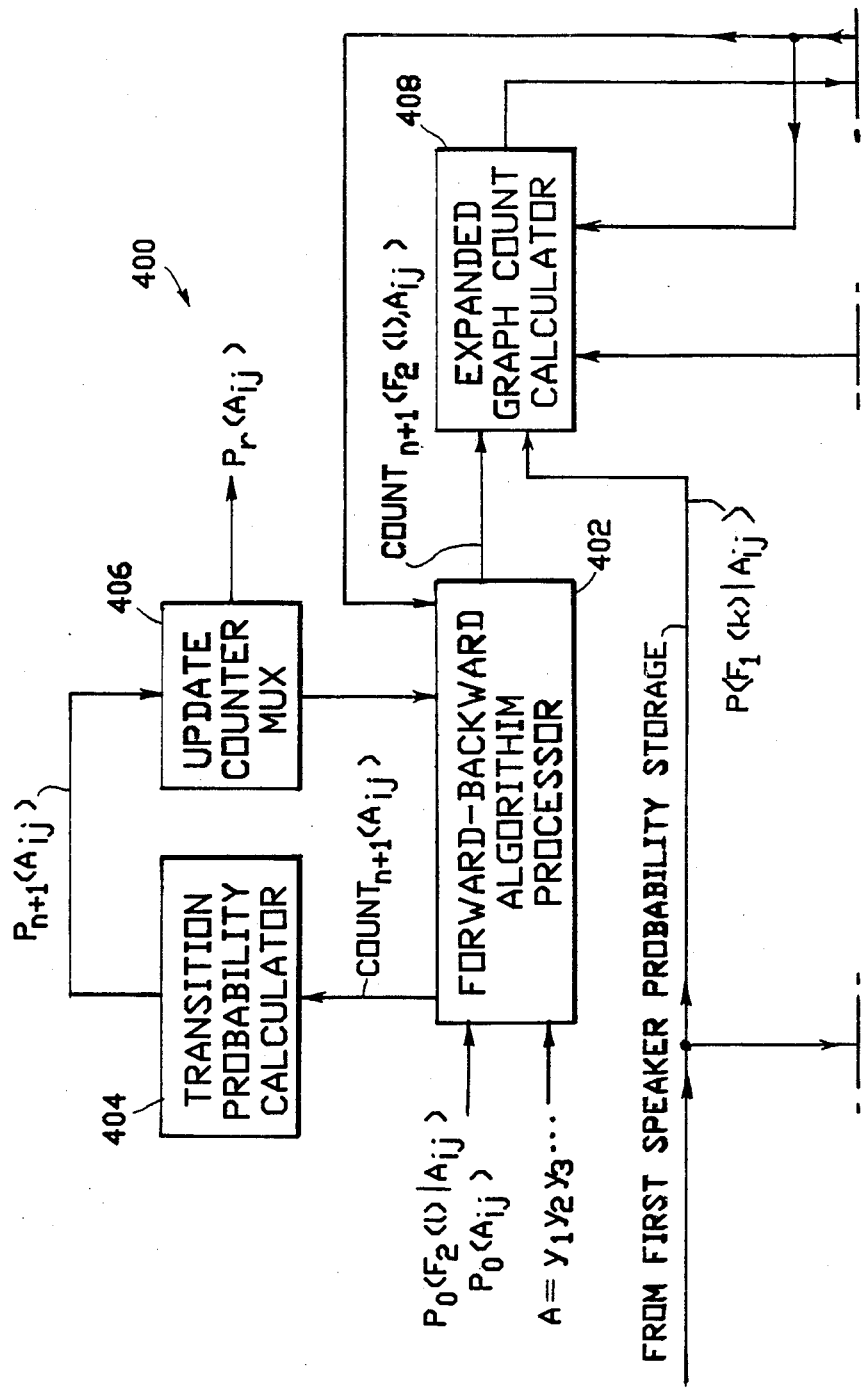
FIG. 12A and 12B are block diagrams of a re-parameterized forward-backward processor of FIG. 8.
Figure 12B:
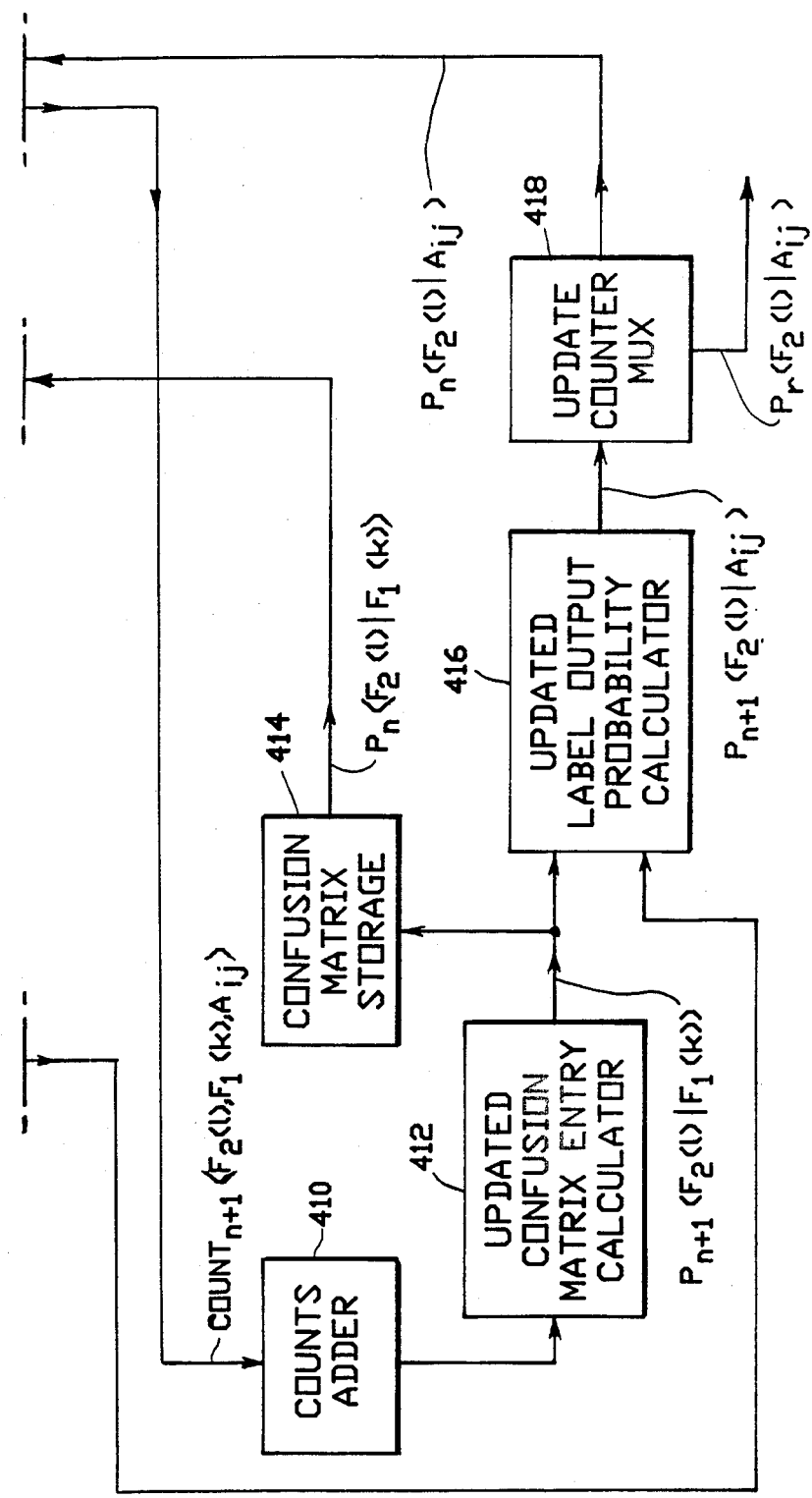

A specific embodiment of a re-parameterized forward-backward processor 400 is illustrated in FIGS. 12A and 12B. The initialized probabilities $P_o(A_{ij})$ and $P_o(F_2(l)|A_{ij})$, and the string of labels for the subsequent speaker $y_1y_2y_3...$ are shown entering a forward-backward algorithm processor 402. In response to these inputs, the processor 402 generates a transition count $count_{n+1}(A_{ij})$ and a label output count $count_{n+1}(F_2(l), A_{ij})$. "n" is an iteration index value which is set to zero for the initialized probabilities. The transition count is normalized in a transition probability calculator 404 to provide an updated transition probability value $P_{n+1}(A_{ij})$ which enters a counter multiplexer 406. For values of n<nmax (where nmax is preferably 3), the updated transition probability value enters the processor 402 as input thereto. When n reaches nmax, the updated transition probability is outputted from the re-parameterized forward-backward processor 400 (as shown in FIG. 12A) as a re-parameterized transition probability $P_r(A_{ij})$.

Referring to FIGS. 12A and 12B, the label output probability count $count_{n+1}(F_2(l), A_{ij})$ is shown entering an expanded graph count calculator 408. Also entering calculator 408 are the label output probabilities previously determined for the reference speaker $P(F_1(k)|A_{ij})$; a previously determined value for the label output probability at time n, $P_n(F_2(l)|A_{ij})$; and a previously determined similarity measure value $P_n(F_2(l)|F_1(k))$. The label output probabilities $P(F_1(k)|A_{ij})$ are received as input from an external element which stores data relating to the reference speaker.

For the first iteration, n=0. Each $P_o$ probability thus represents an initialized value.

The calculator 408, in effect, performs the following calculation to determine relational counts:

$count_{n+1}(F_2(l), F_1(k), A_{ij}) =$ $$count_{n+1}(F_2(l), A_{ij}) \frac{P(F_1(k)|A_{ij})P_n(F_2(l)|F_1(k))}{P_n(F_2(l)|A_{ij})}$$

The right side of the expression includes elements which are provided as inputs to the calculator 408.

By summing the counts $count_{n+1}(F_2(l), F_1(k), A_{ij})$ over all transitions $A_{ij}$ in an adder 410, the following computation is performed:

$$count_{n+1}(F_2(l), F_1(k)) = \sum_{A_{ij}} count_{n+1}(F_2(l), F_1(k), A_{ij})$$

By normalizing the summed counts in an updated confusion matrix entry calculator 412, updated similarity measure values $P_{n+1}(F_2(l)|F_1(k))$ at time (n+1) are computed. The most recent updated value for each similarity measure value is entered into a confusion matrix storage 414. The storage 414 contains one entry for each (l,k) pair of labels. Hence, for an alphabet of N=200 labels, the matrix has 200×200 entries.

A sample matrix is shown in FIG. 13. In the sample matrix, there is a 0.002 probability of label L1 for the subsequent speaker given label K1 of the reference speaker. Similarly, there is a 0.010 probability of label L2 for the subsequent speaker given label K1 of the reference speaker. The probabilities for L3, L4, and L200 (given label K1 of the reference speaker) are 0.001, 0.004, and 0.001, respectively. Labels L5 through L199 also have respective probabilities for label K1. The total of the probabilities along the K1 column (and each other column) equals one. That is, for a given reference speaker label k, one of the labels l for the subsequent speaker is produced.

Referring again to FIGS. 12A and 12B, it is observed that the confusion matrix entries are iteratively updated. The most recent entry values on each iteration are provided as input to the calculator 408 for a next iteration (if any).

In addition, however, the most recent updated entry values enter an updated label output probability calculator 416. The other input to calculator 416 are the label output probabilities associated with the reference speaker; namely, $P(F_1(k)|A_{ij})$ for each k. The calculator 416 produces an updated label output probability $$P_{n+1}(F_2(l)|A_{ij}) = \sum_{k=1}^{N} P(F_1(k)|A_{ij})P(F_2(l)|F_1(k))$$

After n=nmax iterations, an update counter multiplexer 418 provides the updated label output probability $P_r(F_2(l)|A_{ij})$ as an output from the re-parameterized forward-backward processor 400. For previous iterations (n<nmax), the label output probability from the calculator 416 is sent as $P_n(F_2(l)|A_{ij})$ to processor 402 and calculator 408 for a next iteration.

By way of further comment, it is noted that the forward-backward algorithm processor 402 operates in accordance with the teachings set forth in the aforementioned IEEE articles. In brief, the forward-backward algorithm involves computations relating to movement from a state i in a Markov model to a state j in the Markov model. In arriving at state i at a time t, starting at an initial state, there is a predetermined probability $\alpha_t(\text{state}(i))$. Similarly, there is a probability of traversing from state j at time (t+1) through to the final state of the Markov model $\beta_{t+1}(\text{state}(j))$. The $\alpha$ probability involves moving forward to state i whereas $\beta$ involves computing backward from the final state. The count indicating how often a path from the initial state to the final state via the i→j transition is followed wherein label l is produced is represented by the expression:

$$\text{count}_{n+1}(F_2(l), A_{ij}) =$$

$$\sum_{t=1}^{T} \alpha_t(\text{state}(i))P_n(A_{ij})P_n(F_2(l)|A_{ij})\beta_{t+1}(\text{state}(j))\delta(y_t - F_2(l))$$

where t represents time intervals from t=1 to t=T and $\delta=1$ if $y_t=F_2(l)$ and $\delta=0$ otherwise.

Of particular significance, it is noted that all counts $\text{count}_{n+1}(F_2(l), A_{ij})$ for the expanded Markov model graph are readily calculated by using counts obtained for the original graph—i.e., counts related to label output probabilities.

The processor 402 performs the above composition on successive iterations (as n increments in value).

Figure 14:
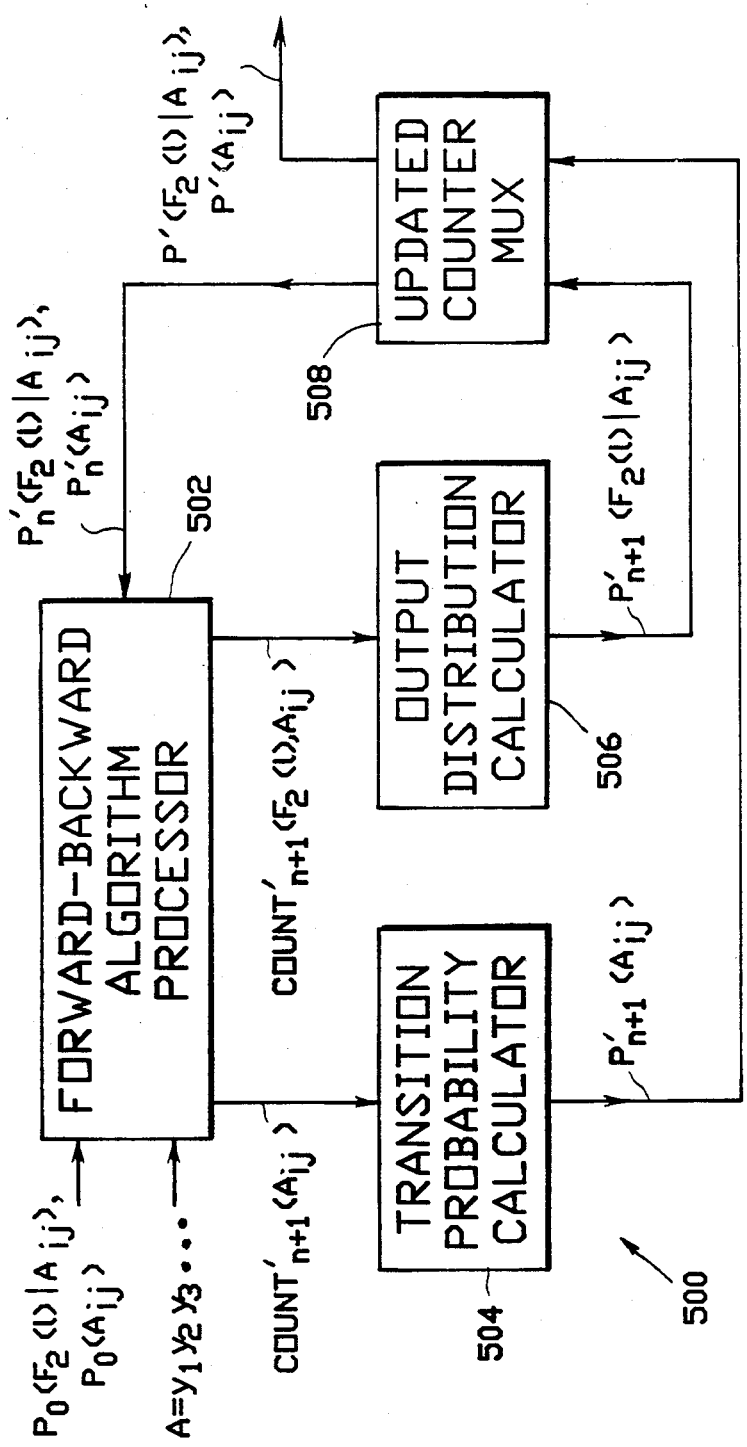
FIG. 14 is a block diagram of a preferred basic parameter forward-backward processor of FIG. 8.

Referring to FIG. 14, an embodiment of a basic parameter forward-backward processor 500 is shown. The basic parameter forward-backward algorithm processor 502—like processor 402—receives the initialized probabilities and label string $y_1y_2y_3...$ as inputs. probability values $P'_n(A_{ij})$ and $P'_n(F_2(l)|A_{ij})$—computed as described below—enter as iteratively updated inputs to the processor 502 when they are generated. In the first iteration n=0. The processor 502 determines basic counts $\text{count}'_{n+1}(A_{ij})$ and $\text{count}'_{n+1}(F_2, A_{ij})$ for transitions and label outputs respectively. Calculators 504 and 506 transform the counts into basic transition probabilities and basic label output probabilities, respectively, by normalizing the counts. The basic probabilities $P'_{n+1}(A_{ij})$ and $P'_{n+1}(F_2(l)|A_{ij})$ enter an updated counter multiplexer 508. If the count for n is less than a value nmax', the basic probabilities enter the processor 502 as inputs $P'_n(A_{ij})$ and $P'_n(F_2(l)|A_{ij})$ for the next iteration of forward-backward processing. When n reaches nmax', the last update basic probabilities $P'(A_{ij})$ and $P'(F_2(l)|A_{ij})$ are outputted.

Referring again to FIG. 8, it is noted that the probabilities $P_r(A_{ij})$ and $P_r(F_2(l)|A_{ij})$ resulting after re-parameterization by the re-parameterized forward-backward processor 208 enter a deleted estimation processor 212. Similarly, the basic parameter probabilities $P'(A_{ij})$ and $P'(F_2(l)|A_{ij})$ which are output from the processor 210 enter another deleted estimation processor 214. Each deletion estimation processor 212 and 214 operate in a similar manner to linearly average probabilities and to smooth the distribution of probabilities. By smoothing, is meant, rounding peaks and raising valleys in the label output probability distribution. The smoothing is required because, due to sparse training data, sharp contrasts in label output probabilities may occur which, with further training data, would be less extreme. The concept of deleted estimation processing is described in a 1979 work by F. Jelinek and R. L. Mercer entitled "Interpolated Estimation of Markov Source Parameters from Sparse Data." In addition, a work entitled *Pattern Recognition in Practice* editted by Gelsema et al. (1980) at pages 381-402 discusses deleted estimation processing. Both references are incorporated herein by reference to provide background.

Figure 15:
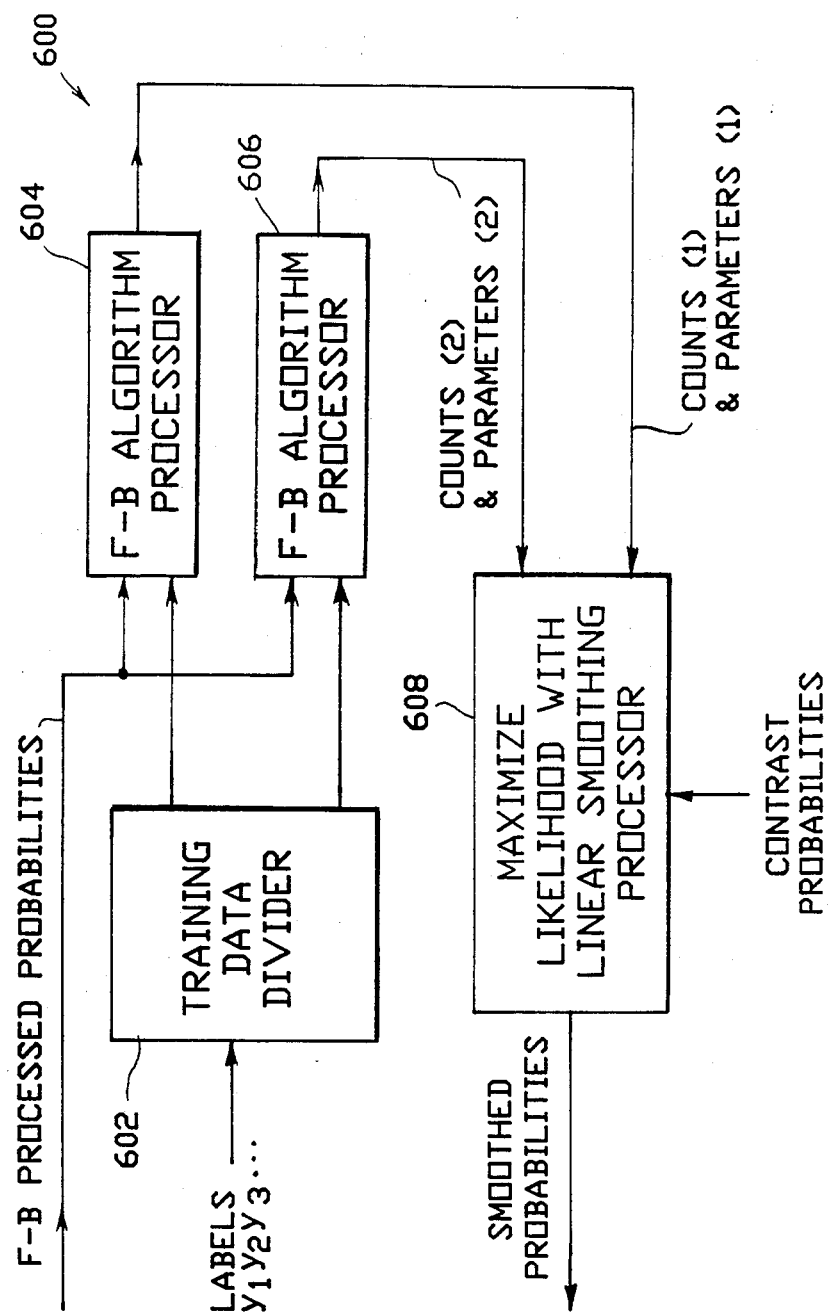
FIG. 15 is a block diagram of a preferred deleted estimation processor, such those of FIG. 8.

In FIG. 15, a preferred deleted estimation processor 600 is shown. The deleted estimation processor 600 has three inputs. The first input is the string of labels $y_1y_2y_3$...

The second input corresponds to forward-backward (F-B) processed probabilities. For deleted estimation processor 212, the second input corresponds to the output from the re-parameterized forward-backward processor 208. For deleted estimation processor 214, the second input corresponds to the output from the basic forward-backward processor 210.

The third input corresponds to contrast probabilities. For deleted estimation processor 212, the third input corresponds to the initialized probabilities produced by the initializer 206. For deleted estimation processor 214, the third input corresponds to the smoothed probabilities computed by the deleted estimation processor 212.

The output from a deleted estimation processor includes (i) linear averaged transition probabilities and (ii) linear averaged label output probabilities, where the probability distributions are smoothed.

The preferable deleted estimation processor 600 (FIG. 15) includes a training data divider 602 which separates the training text labels of the subsequent speaker into two portions. The first portion of labels and the forward-backward processed probabilities (from processor 208 or 210) enter a first forward-backward processor 604. processor 604 computes counts and probabilities therefrom. The second portion of labels and the forward-backward processed probabilities (from processor 208 or 210) enter a second identical forward-backward processor 606. Processor 606 computes counts and probabilities therefrom. The respective counts and probabilities from the processors 604 and 606 enter a maximum likelihood smoother processor 608. The other input to processor 608 are contrast probabilities. The processor 608 performs a linear averaging from the inputs thereto.

In the case of deleted estimation processor 212, the label output counts and the transition counts from F-B processor 604 are identified as $C_1(F_2(l), A_{ij})$ and $C_1(A_{ij})$ and the label output probabilities are identified as $P_1(F_2(l)|A_{ij})$. The label output counts from F-B processor 606 are identified as $C_2$ and the label output probabilities are identified as $P_2$. Preferably, $C_1$ and $P_1$ correspond to the odd sentences label string and $C_2$ and $P_2$ correspond to the even sentences string, based on the separation performed by the training data divider 602.

The computation performed by the maximum likelihood and smoothing processor 608 of the deleted estimation processor 212 is:

$$P_s(F_2(l)|A_{ij}) = \lambda_m P_o(F_2(l)|A_{ij}) +$$

$$(1 - \lambda_m)\left[\frac{C_1(F_2(l), A_{ij}) + C_2(F_2(l), A_{ij})}{C_1(A_{ij}) + C_2(A_{ij})}\right],$$

wherein $\lambda_m$ is a selectable weighting factor and wherein $A_{ij}$ represents a transition from a state i to a state j in a phone machine.

Preferably the factor $\lambda_m$ is selected to maximize the following expression with respect to $\lambda_m$ wherein $\pi$ represents the product over all m values or all $A_{ij} \epsilon S_m$ values:

$$\underset{\lambda_m}{\text{Max}} \; \underset{m}{\pi} \; \underset{(A_{ij}) \epsilon S_m}{\pi} \{[\lambda_m P_o(F_2(l)|A_{ij}) +$$

$$(1 - \lambda_m)P_1(F_2(l)|A_{ij})]^{C_2(F_2(l),A_{ij})} \times$$

$$[\lambda_m P_o(F_2(l)|A_{ij}) + (1 - \lambda_m)P_2(F_2(l)|A_{ij})]^{C_1(F_2(l),A_{ij})}\}$$

where $P_o$ represents an initial probability and wherein $S_m$ represents an mth class of M classes of transitions. All $(A_{ij})$ events are preferably classified so that $$S_m = \{(A_{ij})|T_{m-1} < C_1(A_{ij}) + C_2(A_{ij}) < T_m\}$$

where $T_m$ is a predefined count range limit separating one arc class from another.

In explaining the value M, it is noted that each of the 240 arcs has a count obtained during subsequent speaker training. Prior to smoothing, arcs (i.e., transitions) are classified into M different classes based on count value. For example, arcs having count range limits from 0 to 10 form a first class (m=1), arcs having limits from 10+ to 100 form a second class, and arcs having a limit of 100+ form a third class. (In such case M=3.) The amount of smoothing depends on which class an arc belongs to M is typically less than 10.

In the case of deleted estimation processor 214, the label output counts and the transition counts from F-B processor 604 are identified as $C^*_1$ and the label output probabilities are identified as $P^*_1$. The label output counts and transition counts from F-B processor 606 are identified as $C^*_2$ and the label output probabilities are identified as $P^*_2$. Preferably, $C^*_1$ and $P^*_1$ correspond to the odd sentences label string and $C^*_2$ and $P^*_2$ correspond to the even sentences label string, based on the separation performed by the training data divider 602.

The computation performed by the maximum likelihood smoother processor 608 of the deleted estimation processor 214 is:

$$P^*(F_2(l)|A_{ij}) = \lambda^*_m P_s(F_2(l)|A_{ij}) +$$

$$(1 - \lambda^*_m)\left[\frac{C^*_1(F_2(l), A_{ij}) + C^*_2(F_2(l), A_{ij})}{C^*_1(A_{ij}) + C^*_2(A_{ij})}\right],$$

Preferably the factor $\lambda^*_m$ is selected to maximize the following expression with respect to $\lambda^*_m$.

$$\underset{\lambda^*_m}{\text{Max}} \; \underset{m}{\pi} \; \underset{(A_{ij}) \epsilon S^*_m}{\pi} \{[\lambda^*_m P_s(F_2(l)|A_{ij}) +$$

$$(1 - \lambda^*_m)P^*_1(F_2(l)|A_{ij})]^{C^*_2(F_2(l),A_{ij})} \times$$

$$[\lambda^*_m P_s(F_2(l)|A_{ij}) + (1 - \lambda^*_m)P^*_2(F_2(l)|A_{ij})]^{C^*_1(F_2(l),A_{ij})}\}$$

where $P_s$ represents a smoothed probability and where $S^*_m$ is an mth class of M classes of transitions based on transition count values and is defined as $$S^*_m = \{A_{ij}|T_{m-1} < C^*_1(A_{ij}) + C^*_2(A_{ij}) < T_m\}$$

The label output probabilities computed by the deleted estimation processor 214, $P^*(F_2(l)|A_{ij})$, are greatly improved values over the basic label output probabilities $P'(F_2(l)|A_{ij})$; the re-parameterized label output probabilities $P_r(F_2(l)|A_{ij})$; and the smoothed label output probabilities output from the first deleted estimation processor 212, namely $P_s(F_2(l)|A_{ij})$. A deleted estimation process similar to the one described above is also applied to the transition probabilities to obtain $P^*(A_{ij})$. However, it is noted that the degree of improvement over $P'(A_{ij})$, $P_r(A_{ij})$, or $P_s(A_{ij})$ is not as significant as for the case of output probabilities.

In this regard, the reparameterized methodology of determining label output probabilities from re-parameterized values has been implemented on the IBM MVS system. A series of experiments has been performed for many speakers using a sample training script. When a total of 100 sentences of sample text is used to train subsequent speakers, an average recognition rate of 95% is achieved. Using a shortened training text of 30 sentences—rather than 100 sentences—results in 89% accuracy. Employing the re-parameterization with the shortened training text of 30 sentences has resulted in an average recognition rate of 92.5%. A 30% improvement in the error rate as compared to that of straight 30 sentences training is achieved by the re-parameterization alone. When the two deleted estimation steps are added to the process, accuracy is raised further to approximately 95%. With ⅓ the training text for a subsequent speaker, the present invention permits average recognition accuracy similar to the accuracy achieved based on full text training.

Hence, instead of a 20 minute period for uttering training text, a subsequent speaker need utter only 7 minutes of training text.

Moreover, notwithstanding the various computations discussed hereinabove, the present invention achieves computational savings as compared to processing full training text by conventional forward-backward algorithm techniques.

Figure 16B:
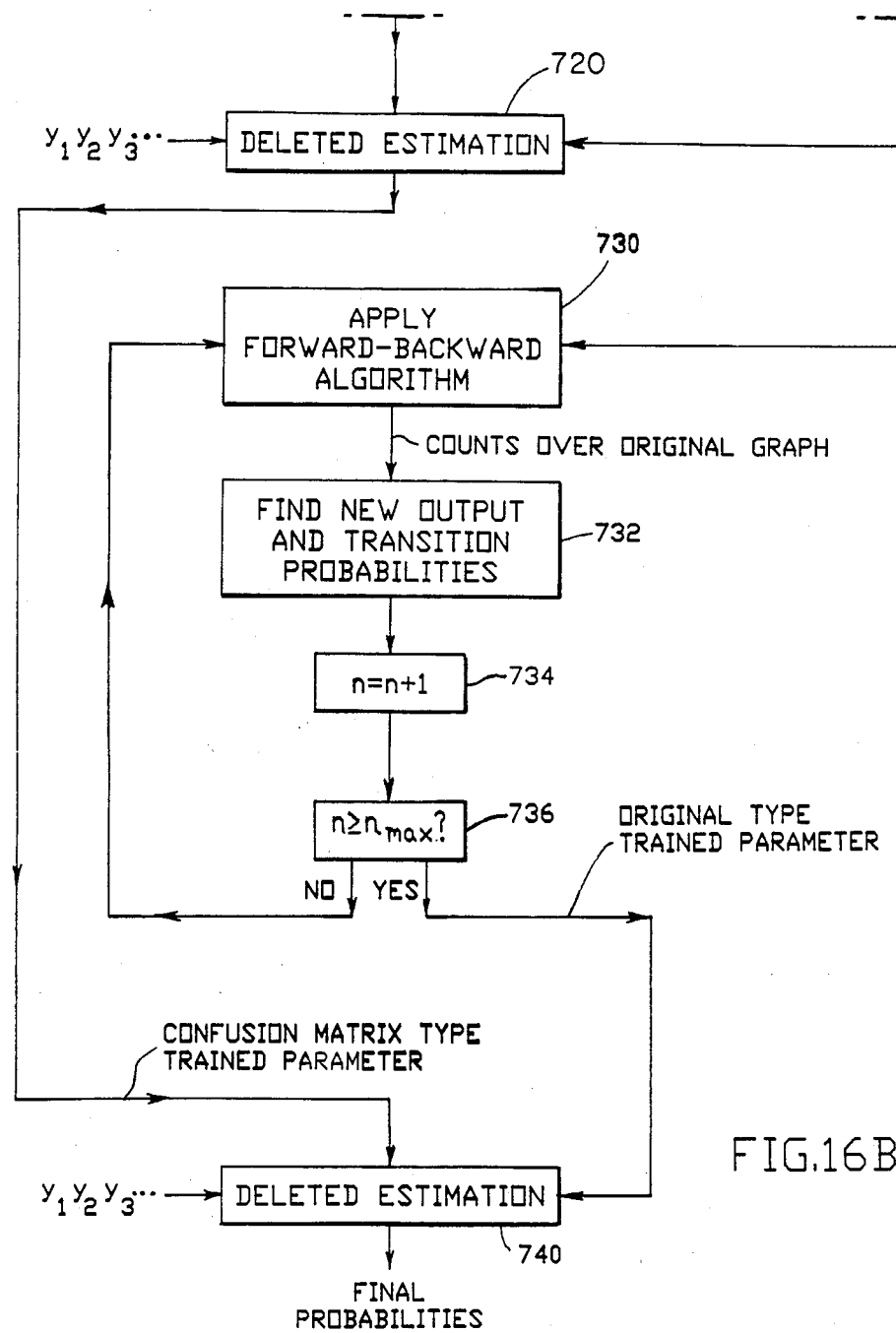

FIGS. 16A and 16B a flowchart of an algorithm 700 which implements the present invention. At steps 701 and 702, index value n is wet to zero and initialized values for transitions, label output, and confusion matrix entry probabilities are set. In step 704, a forward-backward algorithm is applied to generate counts for the original Markov model graph in terms of transition probabilities and label output probabilities. In step 706, the counts $count_{n+1}(F_2(l), A_{ij})$ for the label output probabilities are respecified to provide counts for an expanded Markov model graph (in which the output probabilities correspond to confusion matrix entries) as $count_{n+1}(F_2(l), F_1(k), A_{ij})$.

The counts are summed over all $i \rightarrow j$ transitions to provide counts (step 708) that reflect a similarity measure between an lth label for the subsequent speaker and a kth label for the reference speaker. The entry counts are used to update the probability values for the confusion matrix entries (step 710). Updated re-parameterized label output probabilities are computed in step 712.

While the updated re-parameterized label output probabilities are being determined, conventional techniques are employed in updating the transition probabilities in step 714.

After steps 712 and 714, the value of n is incremented (step 716). If the new value for n is greater than or equal to a prescribed value nmax (where nmax is preferably 3) at step 718, the most recent output at steps 712 and 714 enter a first deleted estimation step 720. If n is less than nmax, steps 704 through 718 repeat. The deleted estimation step 720 provides as outputs smoothed probabilities $P_s(A_{ij})$ and $P_s(F_2(l)|A_{ij})$ wherein the label output probabilities are based in part on similarity information between the reference speaker and the subsequent speaker.

While the probabilities $P_s(A_{ij})$ and $P_s(F_2(l)|A_{ij})$ are being computed, a basic forward-backward algorithm is iteratively applied, starting with the initial probabilities for the first iteration at n=0 at step 730. Over successive iterations, updated transition and label output probabilities are computed in standard fashion in step 732. Steps 734 and 736 effect the iterations until n≧nmax is reached, whereupon the last update basic transition probabilities $P'(A_{ij})$ and last update basic label output probabilities $P'(F_2(l)|A_{ij})$ are provided as output directed to a second deleted estimation step 740.

In step 740, the smoothed probabilities from the first deleted estimation step 720 and the last update basic label output and transition probabilities following step 736 enter a deleted estimation processor (such as processor 600 described hereinabove) together with the label string $y_1y_2y_3$... At step 740, final label output probabilities $P^*(F_2(l)|A_{ij})$ and transition probabilities $P^*(A_{ij})$ are determined.

While the invention has been described with reference to preferred embodiments thereof, it will be understood by those skilled in the art that various changes in form and details may be made without departing from the scope of the invention.

In this regard it is observed that the present invention is applicable in general to Markov model speech recognition. Accordingly, the invention applies whether phonetic phone machines, fenemic phone machines, or other Markov model phone machines are employed.

TABLE 1

THE TWO LETTERS ROUGLY REPRESENT THE SOUND OF THE ELEMENT. TWO DIGITS ARE ASSOCIATED WITH VOWELS: FIRST DIGIT IS STRESS OF SOUND AND SECOND DIGIT IS CURRENT IDENTIFICATION NUMBER. ONE DIGIT ONLY IS ASSOCIATED WITH CONSONANTS AND IS CURRENT IDENTIFICATION NUMBER.

| | | | | |
|---|---|---|---|---|
| 001 AA11 | 029 BX2- | 057 EH102 | 148 TX5- | 176 XX11 |
| 002 AA12 | 030 BX3- | 058 EH11 | 149 TX6- | 177 XX12 |
| 003 AA13 | 031 BX4- | 059 EH12 | 150 UH01 | 178 XX13 |
| 004 AA14 | 032 BX5- | 060 EH13 | 151 UH02 | 179 XX14 |
| 005 AA15 | 033 BX6- | 061 EH14 | 152 UH11 | 180 XX15 |
| 006 AE11 | 034 BX7- | 062 EH15 | 153 UH12 | 181 XX16 |
| 007 AE12 | 035 BX8- | 126 RX1- | 154 UH13 | 182 XX17 |
| 008 AE13 | 036 BX9- | 127 SH1- | 155 UH14 | 183 XX18 |
| 009 AE14 | 037 DH1- | 128 SH2- | 156 UU11 | 184 XX19 |
| 010 AF15 | 038 DH2- | 129 SX1- | 157 UU12 | 185 XX2- |
| 011 AW11 | 039 DQ1- | 130 SX2- | 158 UXG1 | 186 XX20 |
| 012 AW12 | 040 DQ2- | 131 SX3- | 159 UXG2 | 187 XX21 |
| 013 AW13 | 041 DQ3- | 132 SX4- | 160 UX11 | 188 XX22 |
| 014 AX11 | 042 DQ4- | 133 SX5- | 161 UX12 | 189 XX23 |
| 015 AX12 | 043 DX1- | 134 SX6- | 162 UX13 | 190 XX24 |
| 016 AX13 | 044 DX2- | 135 SX7- | 163 VX1- | 191 XX3- |
| 017 AX14 | 045 EE01 | 136 TH1- | 164 VX2- | 192 XX4- |
| 018 AX15 | 046 EE02 | 137 TH2- | 165 VX3- | 193 XX5- |
| 019 AX16 | 047 EE11 | 138 TH3- | 166 VX4- | 194 XX6- |
| 020 AX17 | 048 EE12 | 139 TH4- | 167 WX1- | 195 XX7- |
| 021 BQ1- | 049 EE13 | 140 TH5- | 168 WX2- | 196 XX8- |
| 022 BQ2- | 050 EE14 | 141 TQ1- | 169 WX3- | 197 XX9- |
| 023 BQ3- | 051 EE15 | 142 TQ2- | 170 WX4- | 198 ZX1- |
| 024 BQ4- | 052 EE16 | 143 TX3- | 171 WX5- | 199 ZX2- |
| 025 BX1- | 053 EE17 | 144 TX1- | 172 WX6- | 200 ZX3- |
| 026 BX10 | 054 EE18 | 145 TX2- | 173 WX7- | |
| 027 BX11 | 055 EE19 | 146 TX3- | 174 XX1- | |
| 028 BX12 | 056 EH101 | 147 TX4- | 175 XX10 | |

TABLE 2

| PHONE | 3 | DH | 7 NODES. | 13 ARCS. | 3 ARC LABELS. | |
|---|---|---|---|---|---|---|
| NODE | 1 | 2 | 3 | 4 | 5 | 6 | 7 |
| LABEL | 8 | 9 | 10 | 11 | 12 | 13 | 0 |
| COUNT | 31.0 | 1.7 | 1.7 | 119.1 | 115.4 | 120.1 | 0.0 |
| ARC | 1 → 2 | 1 → 4 | 1 → 7 | 2 → 3 | 2 → 7 | 3 → 7 | 3 → 7 |
| LABEL | 4 | 4 | NULL | 5 | NULL | 6 | NULL |
| PROB | 0.07243 | 0.92757 | 0.00000 | 0.99259 | 0.00741 | 0.93982 | 0.06018 |
| ARC | 4 → 4 | 4 → 5 | 5 → 5 | 5 → 6 | 6 → 6 | 6 → 7 | |
| LABEL | 4 | 5 | 5 | 5 | 6 | 6 | |
| PROB | 0.75179 | 0.24821 | 0.74389 | 0.25611 | 0.75370 | 0.24630 | |
| LABEL | 4 | 5 | 6 | | | | |
| COUNT | 120.8 | 146.4 | 121.6 | | | | |
| AE13 | | | 0.091 | | | | |
| BX10 | 0.030 | | | | | | |
| BX3_ | 0.130 | | | | | | |
| BX8_ | 0.011 | 0.086 | | | | | |
| DH1_ | 0.020 | 0.040 | 0.013 | | | | |
| DQ2 | 0.011 | 0.052 | | | | | |

TABLE 2-continued

| | | | |
|---|---|---|---|
| EH0T | 0.010 | 0.014 | 0.167 |
| EH02 | | | 0.026 |
| EH11 | | | 0.015 |
| EH13 | | | 0.012 |
| EH14 | | | 0.062 |
| ER14 | | | 0.024 |
| FX2_ | | 0.045 | |
| FX3_ | | 0.148 | |
| GX2_ | | 0.013 | |
| GX5_ | 0.148 | | |
| GX6_ | 0.246 | 0.023 | |
| HX1_ | | 0.011 | |
| IX04 | 0.011 | | 0.020 |
| IX13 | 0.025 | | 0.026 |
| KQ1_ | | 0.014 | 0.024 |
| KX2_ | | 0.013 | |
| MX2_ | 0.029 | 0.043 | 0.012 |
| NX3_ | 0.019 | | |
| NX5_ | 0.049 | | |
| NX6_ | | 0.017 | 0.012 |
| OU14 | | | 0.023 |
| PQ1_ | 0.029 | 0.018 | |
| TH2_ | | 0.020 | |
| TQ3_ | | 0.017 | |
| UH0T | | | 0.020 |
| UH02 | 0.025 | 0.082 | 0.109 |
| UXG2 | | | 0.016 |
| UX12 | | | 0.062 |
| UX13 | | | 0.183 |
| VX1_ | | | 0.016 |
| VX3_ | 0.041 | 0.283 | 0.016 |
| WX2_ | 0.023 | 0.014 | |
| XX23 | 0.072 | | |
| OTHER | 0.073 | 0.047 | 0.048 |

We claim:

1. In a speech recognizer in which each successive interval of speech is associated with one label output of an alphabet of label outputs and in which words correspond to respective sequences of Markov model phone machines, wherein each phone machine has a plurality of transitions each extending from a state i to a state j and wherein the probability of each transition and the probability of label outputs being produced at transitions differ among speakers, computerized apparatus for training the recognizer to the probabilities of a subsequent speaker after the recognizer is trained with the probabilities of a reference speaker in response to the utterance by said reference speaker of a sample text, the apparatus comprising:

acoustic processor means for outputting a string of one label after another at successive time intervals in response to a speech input;

means for computing basic label output probability values from labels generated by said acoustic processor means in response to the subsequent speaker uttering part of the sample text;

means for generating smoothed label output probabilities for the subsequent speaker which are based on a similarity measure determined between the subsequent speaker and the reference speaker, the smoothed label output probabilities being more informative than the basic label output probabilities; and means for linear averaging the basic label output probabilities against the smoothed label output probabilities, given the label outputs generated in response to the subsequent speaker uttering said part of the sample text, to produce final label output probabilities.

2. The apparatus of claim 1 wherein said linear averaging means includes a deleted estimation processor.

3. The apparatus of claim 2 wherein said deleted estimation processor includes:

means for dividing label inputs generated by the acoustic processor means during utterance of sample text into two portions;

means for applying a forward-backward algorithm to the basic label output probabilities for one of the two portions of labels to produce counts $C^*_1$ and probabilities $P^*_1$;

means for applying a forward-backward algorithm to the basic label output probabilities for the other portion of labels to produce counts $C^*_2$ and probabilities $P^*_2$;

smoothing processor means, which receives as input the counts $C^*_1$ and $C^*_2$ and the probabilities $P^*_1$ and $P^*_2$ together with smoothed label output probabilities, for producing final label output probabilities $$P^*(F_2(l)|A_{ij}) = \lambda^*_m P_s(F_2(l)|A_{ij}) + (1 - \lambda^*_m)\left[\frac{C^*_1(F_2(l), A_{ij}) + C^*_2(F_2(l), A_{ij})}{C^*_1(A_{ij}) + C^*_2(A_{ij})}\right],$$

wherein $\lambda^*_m$ is selected to maximize the likelihood of the final label output probabilities corresponding to spoken text and wherein $A_{ij}$ represents a transition from a state i to a state j in a phone machine.

4. Apparatus as in claim 3 wherein the smoothing processor means includes means for evaluating $\lambda^*_m$ according to the expression:

$$\operatorname*{Max}_{\lambda^*_m} \pi_m \pi_{(A_{ij}) \in S^*_m} \{[\lambda^*_m P_s(F_2(l)|A_{ij}) + (1 - \lambda^*_m)P^*_1(F_2(l)|A_{ij})]^{C^*_2(F_2(l), A_{ij})} \times$$

-continued $$[\lambda^*_m P^*_s(F_2(l)|A_{ij}) + (1 - \lambda^*_m)P^*_2(F_2(l)|A_{ij})]^{C^*_1(F_2(l),A_{ij})}$$

where $S^*_m$ represents an mth class of transitions such that $$S^*_m = \{A_{ij} | T_{m-1} < C^*_1(A_{ij}) + C^*_2(A_{ij}) < T_m\};$$

wherein $T_m$ represents a predefined count range limit and wherein each class of transitions is defined between a pair of adjacent range limits.

5. The apparatus of claim 1 wherein said smoothed label generating means includes:
  re-parameterizing means for computing smoothed label output probabilities $P_s(F_2(l)|A_{ij})$ in response to receiving as inputs (i) the known label output probabilities of the reference speaker $P(F_1(k)|A_{ij})$, (ii) initialized label output probabilities and transition probabilities $P_o(F_2(l)|A_{ij})$ and $P_o(A_{ij})$, respectively, and (iii) labels generated by said acoustic processor means in response to the subsequent speaker uttering said part of the sample text.

6. Apparatus as in claim 5 wherein said re-parameterizing means includes:
  means for computing a respective probability value $P[F_2(l)|F_1(k)]$ for each entry in a confusion matrix indicative of the probability of the lth label as spoken by the subsequent speaker corresponding to the kth label as spoken by the reference speaker;
  means for storing the values for the confusion matrix entries;
  means for expanding each label output probability of the subsequent speaker $P[F_2(l)|A_{ij}]$ in terms of confusion matrix entry values and label output probabilities for the reference speaker as:

$$P[F_2(l)|A_{ij}] = \sum_{k=1}^{N} P(F_1(k)|A_{ij})P(F_2(l)|F_1(k))$$

where N is the number of labels in the alphabet of labels.

7. Apparatus as in claim 6 wherein said expanding means includes:
  means for calculating a transition probability $P(A_{ij})$ in response to a transition count input;
  forward-backward processor means for iteratively producing transition counts $count_{n+1}(A_{ij})$ and label output counts $count_{n+1}(F_2(l), A_{ij})$ in response to a transition probability input $P_n(A_{ij})$, a previously calculated label output probability $P_n(F_2(l)|A_{ij})$, and labels generated in response to the subsequent speaker uttering said part of the sample text;
  entry update calculator means for computing a value $P_{n+1}(F_2(l)|F_1(k))$ in response to receiving as input (i) a previous entry value $P_n(F_2(l)|F_1(k))$, (ii) label output probabilities for the reference speaker $P(F_1(k)|A_{ij})$, (iii) the most recent label output count $count_{n+1}(F_2(l), A_{ij})$ from the forward-backward processor means, and (iv) a previous label output probability value $P_n(F_2(l)|A_{ij})$; and
  calculator means for computing updated re-parameterized label output probabilities $$P_{n+1}[F_2(l)|A_{ij}] = \sum_{k=1}^{N} P(F_1(k)|A_{ij})P_{n+1}(F_2(l)|F_1(k)).$$

8. Apparatus as in claim 7 further comprising:
  initializing means for producing initial values for $P_o(A_{ij})$ the transition probabilities and for $P_o(F_2(l)|A_{ij})$ the label output probabilities; and
  deleted estimation processor means for linear averaging the re-parameterized label output probabilities received as input from said re-parameterizing means against the initial label output probabilities received as input from the initializing means, given the label outputs generated by the acoustic processor means in response to the subsequent speaker uttering said part of the sample text, to produce smoothed label output probabilities $P_s(F_2(l)|A_{ij})$ which have a smoothed probability distribution.

9. In a speech recognizer in which each successive interval of speech is associated with one label output from an alphabet of label outputs and in which words are modelled to include states with transitions wherein each transition extends from a state i to a state j and wherein the probability of each transition and respective probabilities of speech types being produced at any given transition are variable between a reference speaker and a subsequent speaker, a computerized method of determining informative label output probabilities for a subsequent speaker given the probabilities for the reference speaker, the method comprising the steps of:
  (a) computing initial transition probabilities $P_n(A_{ij})$ and label output probabilities $P_n(F_2(l)|A_{ij})$ for the lth label output being produced at transition $A_{ij}$ of the subsequent speaker wherein n=0;
  (b) applying a forward-backward algorithm to transition probabilities $P_n(A_{ij})$ and label output probabilities $P_n(F_2(l)|A_{ij})$ given a string of label outputs generated in response to the subsequent speaker uttering part of the sample text to compute updated counts;
  (c) computing, from updated counts, a basic label output probability for each label output at each transition;
  (d) incrementing n and repeating step (b) through (d) until n reaches a prescribed value nmax, the label outputs computed at time n=nmax representing updated basic label output probabilities;
  (e) storing a matrix which includes entries indicating similarity factors between the lth label output for the subsequent speaker and the kth label output of the reference speaker;
  (f) determining relational label output probabilities based on the stored similarity factors, the label output probabilities for the reference speaker, and the initial probabilities; and
  (g) linear averaging the relational label output probabilities and the updated basic label output probabilities to provide final informative label output probabilities.

10. In a speech recognizer which generates a string of label outputs in response to an uttered speech input and in which words are represented by Markov models characterized by a plurality of states and transitions between states, wherein the probability of each transition $A_{ij}$ from a state i to a state j and each respective probability of producing a given label output at a given transition differ between a reference speaker and a subsequent speaker, a computerized method of determining label output probabilities for the subsequent speaker comprising the steps of:

(a) initializing transition probabilities $P_n(A_{ij})$, label output probabilities $P_n(F_2(l)|A_{ij})$, and confusion matrix entries $P_n(F_2(l)|F_1(k))$ which indicate the similarity between the lth label output as spoken by the subsequent speaker and the kth label output as spoken by the reference speaker where n is initialized to zero;

(b) applying a forward-backward algorithm to the values $P_n(A_{ij})$, $P_n(F_2(l)|A_{ij})$, and $P_n(F_2(l)|F_1(k))$ to provide label output counts for the subsequent speaker $count_{n+1}(F_2(l), A_{ij})$;

(c) computing re-parameterized counts $count_{n+1}(F_2(l), F_1(k), A_{ij})$ for each $A_{ij}$ transition;

(d) computing updated probability values $P_{n+1}(F_2(l)|F_1(k))$ for confusion matrix entries from the computed re-parameterized counts;

(e) computing re-parameterized label output probabilities from the $P(F_1(k)|A_{ij})$ and $P_{n+1}(F_2(l)|F_1(k))$ probability values;

(f) incrementing n and repeating steps (b) through (e) until n equals a prescribed value nmax;

the re-parameterized label output probabilities at iteration n = nmax representing updated re-parameterized label output probabilities;

(g) linear averaging the updated re-parameterized label output probabilities against the initial label output probabilities to provide smoothed label output probabilities;

(h) initializing the basic transition probabilities and basic label output probabilities;

(j) applying the forward-backward algorithm to the basic probabilities;

(k) repeating step (j) over a prescribed number of mmax of iterations to provide updated basic label output probabilities and transition probabilities; and (l) linear averaging the updated basic label output probabilities against the smoothed label output probabilities to provide final label output probabilities.

11. A method as in claim 10 wherein step (g) includes the steps of:

(m) dividing into two portions the labels generated by an acoustic processor in response to the subsequent speaker uttering part of a sample text;

(n) entering the first portion of labels and updated re-parameterized probabilities into a forward-backward algorithm processor and computing counts $C_1$ and a probability $P_1$;

(o) entering the second portion of labels and updated re-parameterized probabilities into a forward-backward algorithm processor and computing counts $C_2$ and a probability $P_2$; and (p) computing the smoothed label output probabilities according to the expression:

$$P_s(F_2(l)|A_{ij}) = \lambda_m P_o(F_2(l)|A_{ij}) + (1 - \lambda_m)\left[\frac{C_1(F_2(l),A_{ij}) + C_2(F_2(l),A_{ij})}{C_1(A_{ij}) + C_2(A_{ij})}\right],$$

wherein $\lambda_m$ is a selectable weighting factor and wherein $A_{ij}$ represents a transition from a state i to a state j in a phone machine.

12. A method as in claim 11 comprising the further step of:

(q) selecting $\lambda_m$ according to the expression:

$$\underset{\lambda_m\ m(A_{ij})\in S_m}{\text{Max}\pi\ \pi}\{[\lambda_m P_o(F_2(l)|A_{ij}) + (1-\lambda_m)P_1(F_2(l)|A_{ij})]^{C_2(F_2(l),A_{ij})} \times [\lambda_m P_o(F_2(l)|A_{ij}) + (1-\lambda_m)P_2(F_2(l)|A_{ij})]^{C_1(F_2(l),A_{ij})}\}$$

where $P_o$ represents an initial probability and wherein $S_m$ represents an mth class of M classes of transitions.

13. A method as in claim 10 wherein step (l) includes the steps of:

(r) dividing into two portions the labels generated by an acoustic processor in response to the subsequent speaker uttering part of a sample text;

(s) entering the first portion of labels and updated basic probabilities into a forward-backward algorithm processor and computing counts $C^*_1$ and a probability $P^*_1$;

(t) entering the second portion of labels and updated basic probabilities into a forward-backward algorithm processor and computing counts $C^*_2$ and a probability $P^*_2$; and (u) computing final label output probabilities according to the expression:

$$P^*(F_2(l)|A_{ij}) = \lambda^*_m P_s(F_2(l)|A_{ij}) + (1 - \lambda^*_m)\left[\frac{C^*_1(F_2(l), A_{ij}) + C^*_2(F_2(l), A_{ij})}{C^*_1(A_{ij}) + C^*_2(A_{ij})}\right],$$

wherein $\lambda^*_m$ is a selectable weighting factor and wherein $A_{ij}$ represents a transition from a state i to a state j in a phone machine.

14. A method as in claim 13 comprising the further step of:

(v) selecting $\lambda^*_m$ according to the expression:

$$\underset{\lambda^*_m\ m(A_{ij})\in S^*_m}{\text{Max}\pi\ \pi}\{[\lambda^*_m P^*_s(F_2(l)|A_{ij}) + (1-\lambda^*_m)P^*_1(F_2(l)|A_{ij})]^{C^*_2(F_2(l),A_{ij})} \times [\lambda^*_m P^*_s(F_2(l)|A_{ij}) + (1-\lambda^*_m)P^*_2(F_2(l)|A_{ij})]^{C^*_1(F_2(l),A_{ij})}\}$$

where $S^*_m$ represents an mth class of M transitions where transitions are classified based on transition count value.

15. A machine-implemented method for training a Markov model speech recognition system to a subsequent speaker after the system is trained to a first speaker, comprising the steps of:

(a) generating a string of speech-type labels in an acoustic processor in response to the utterance of a full-length sample text by a first speaker;

(b) computing, based on the label string generated for the first speaker the probabilities $P(F_1(k)|A_{ij})$ of each kth label output $F_1(k)$ being produced at a transition $A_{ij}$ from a state i to state j of a Markov model phone machine for the first speaker;

(c) computing probability values for a confusion matrix between each kth label of the first speaker and each lth label of the subsequent speaker, each matrix entry being of the form $P(F_2(l)|F_1(k))$;

(d) storing in memory the confusion matrix entries; and (e) computing probabilities of each lth label $F_2(l)$ being outputted at a transition $A_{ij}$ of a Markov model phone machine for the subsequent speaker as:

$$P(F_2(l)|A_{ij}) = \sum_{k=1}^{N} P(F_1(k)|A_{ij})P(F_2(l)|F_1(k)).$$

16. The method of claim 15, wherein said confusion matrix value computing step includes the steps of:
(f) generating a short string of labels in the acoustic processor in response to the utterance by the subsequent speaker of a shortened sample text;
(g) initializing transition probability values $P_n(A_{ij})$ and label probability values $P_n(F_2(l)|A_{ij})$ for the phone machines corresponding to the subsequent speaker, based on the short string of labels, where index value n=0;
(h) computing, with a forward-backward algorithm, up-dated transition counts $\text{count}_{n+1}(A_{ij})$;
(j) computing, with a forward-backward algorithm, up-dated label output probability counts as:

$$\text{count}_{n+1}(F_2(l),A_{ij}) =$$

$$\sum_{t=1}^{T} \alpha_t(\text{state}(i))P_n(A_{ij})P_n(F_2(l)|A_{ij})B_{t+1}(\text{state}(j))$$

wherein $\alpha_t$ is a cumulative probability in moving forward to state i from an initial state and where $\beta_{t+1}$ is a cumulative probability of proceeding backward from a final state of a Markov model sequence of states to state j;
(k) from counts $\text{count}_{n+1}(A_{ij})$ and counts $\text{count}_{n+1}(F_2(l),A_{ij})$, computing up-dated transition probability values $P_{n+1}(A_{ij})$ and up-dated values for $P_{n+1}(F_2(l)|A_{ij})$.

17. The method of claim 16, wherein computing updated $P_{n+1}(F_2(l)|A_{ij})$ values comprises the steps of:
(m) computing a relational count as:

$$\text{count}_{n+1}(F_2(l),F_1(k),A_{ij}) =$$

$$\text{count}_{n+1}(F_2(l),A_{ij}) \frac{P(F_1(k)|A_{ij})P_n(F_2(l)|F_1(k))}{P_n(F_2(l)|A_{ij})}$$

(n) summing the relational counts over all transitions $A_{ij}$ as:

$$\text{count}_{n+1}(F_2(l),F_1(k)) = \sum_{A_{ij}} \text{count}_{n+1}(F_2(l),F_1(k),A_{ij})$$

(o) from the summed relational counts, estimating up-dated confusion matrix values as:

$$P_{n+1}(F_2(l)|F_1(k)) = \frac{\text{count}_{n+1}(F_2(l),F_1(k))}{\sum_{l=1}^{N} \text{count}_{n+1}(F_2(l),F_1(k))}.$$

18. The method of claim 17, comprising the further steps of:
(p) incrementing the value of n and repeating steps (h) through (o) over a prescribed number of iterations; the label output probabilities resulting after the prescribed number of iterations representing updated reparameterized label output probabilities.

19. The method of claim 18, comprising the further step of:
(q) producing, in response to the entry of (i) updated transition probabilities and reparameterized label output probabilities, (ii) initialized probabilities, and (iii) the short string of labels into a deleted estimation processor linear averaged smoothed enhanced probabilities between the updated reparameterized label output probabilities and the initialized label output probabilities.

20. The method of claim 19, wherein the step of producing smoothed probabilities includes the steps of:
(r) dividing the short string of labels into two portions;
(s) applying a forward-backward algorithm, which is based on the updated probabilities, to the first portion of labels to generate counts $C_1(F_2(l), A_{ij})$ and $C_1(A_{ij})$ and a probability $P_1(F_2(l)|A_{ij})$ for each label output;
(t) applying a forward-backward algorithm, which is based on the last update probabilities, to the second portion to generate counts $C_2(F_2(l), A_{ij})$ and $C_2(A_{ij})$ and a probability $P_2(\text{Fhd } 2(l)|, A_{ij})$ for each label output, and
(u) evaluating a factor $\lambda_m$ to maximize the likelihood the expression:

$$\underset{\lambda_m}{\text{Max}} \pi \underset{m(A_{ij})\in S_m}{\pi} \{[\lambda_m P_o(F_2(l)|A_{ij}) +$$

$$(1 - \lambda_m)P_1(F_2(l)|A_{ij})]^{C_2(F_2(l),A_{ij})} \times$$

$$[\lambda_m P_o(F_2(l)|A_{ij}) + (1 - \lambda_m)P_2(F_2(l)|A_{ij})]^{C_1(F_2(l),A_{ij})}\}$$

where $P_o$ represents an initial probability and wherein $S_m$ represents an mth class of M transitions where transitions are classified based on transition count value.

21. The method of claim 20, wherein the step of producing the smoothed probabilities further comprises the step of:
(v) computing:

$$P_s(F_2(l)|A_{ij}) =$$

$$\lambda_m P_o(F_2(l)|A_{ij}) + (1 - \lambda_m)\left[\frac{C_1(F_2(l),A_{ij}) + C_2(F_2(l),A_{ij})}{C_1(A_{ij}) + C_2(A_{ij})}\right],$$

wherein $\lambda_m$ is a selectable weighting factor and wherein $A_{ij}$ represents a transition from a state i to a state j in a phone machine.

22. The method of claim 21, comprising the further steps of:
(w) computing basic transition probabilities and label output probabilities for the phone machines of the subsequent speaker which includes the steps of applying a forward-backward algorithm to the short string of labels to compute basic counts and normalizing the basic counts;
(x) producing, in response to the entry of (i) smoothed transition probabilities and smoothed label output probabilities (ii) basic transition probabilities and basic label output probabilities, and (iii) the short string of labels into a deleted estimation processor, final label output probabilities which are linearly averaged between the smoothed label output probabilities and the basic label output probabilities.

23. The method of claim 22, wherein the step of producing final label output probabilities includes the steps of:

(y) dividing the short string of labels into two portions;

(z) applying a forward-backward algorithm, which is based on the smoothed label output probabilities, to the first portion of labels to generate counts $C^*_1(F(l)|A_{ij})$ and $C^*_1(A_{ij})$ and a probability $P^*_1(F(l)|A_{ij})$ for each label output;

(aa) applying a forward-backward algorithm, which is based on the smoothed label output probabilities, to the second portion to generate counts $C^*_2(F(l)|A_{ij})$ and $C^*_2(A_{ij})$ and a probability $P^*_2(F(l)|A_{ij})$ for each label output, and evaluating a factor $\lambda^*_m$ to maximize the likelihood of the expression:

$$\underset{\lambda^*_m}{\text{Max}} \underset{m(A_{ij}) \in S^*_m}{\pi} \{[\lambda^*_m P_s(F_2(l)|A_{ij}) +$$

$$(1 - \lambda^*_m)P^*_1(F_2(l)|A_{ij})]^{C^*_2(F_2(l),A_{ij})} \times$$

-continued
$$[\lambda^*_m P_s(F_2(l)|A_{ij}) + (1 - \lambda^*_m)P^*_2(F_2(l)|A_{ij})]^{C^*_1(F_2(l),A_{ij})}\}$$

where $P_s$ represents a smoothed probability and where $S^*_m$ is an mth class of M classes of transitions based on transition count values and is defined as $$S^*_m = \{A_{ij} | T_{m-1} < C^*_1(A_{ij}) + C^*_2(A_{ij}) < T_m\}$$

where $T_{m-1}$ and $T_m$ are adjacent predefined count range limits which specify a respective class of transitions having counts between the two limits.

24. The method of claim 23, wherein the step of producing the final label output probabilities further comprises the step of:

(bb) computing:

$$P^*(F_2(l)|A_{ij}) =$$

$$\lambda^*_m P_s(F_2(l)|A_{ij}) + (1 - \lambda^*_m)\left[\frac{C^*_1(F_2(l),A_{ij}) + C^*_2(F_2(l),A_{ij})}{C^*_1(A_{ij}) + C^*_2(A_{ij})}\right].$$

25. The method of claim 24 further comprising the step of: producing final transition probabilities which are linearly averaged between the smoothed transition probabilities and the basic transition probabilities.

* * * * *